US008724743B2

(12) United States Patent
Dotzler et al.

(10) Patent No.: US 8,724,743 B2
(45) Date of Patent: May 13, 2014

(54) APPARATUS AND METHOD FOR CALCULATING RECEIVE PARAMETERS FOR AN MIMO SYSTEM

(75) Inventors: Andreas Dotzler, Munich (DE); Christian Guthy, Munich (DE); Wolfgang Utschick, Ingolstadt (DE); Guido Dietl, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 90 days.

(21) Appl. No.: 13/185,987

(22) Filed: Jul. 19, 2011

(65) Prior Publication Data
US 2012/0020422 A1 Jan. 26, 2012

(30) Foreign Application Priority Data
Jul. 20, 2010 (EP) .................................... 10170166

(51) Int. Cl.
*H03K 9/00* (2006.01)
*H04L 27/00* (2006.01)

(52) U.S. Cl.
USPC ............. 375/316; 375/267; 375/347; 455/69; 455/101; 455/115.1; 455/273; 455/424; 370/341; 370/329; 370/332; 370/437

(58) Field of Classification Search
CPC ............... H04L 5/0023; H04L 5/0037; H04L 25/00343; H04L 25/0242; H04B 7/0452
USPC ......... 375/316, 267, 347; 455/69, 101, 115.1, 455/273, 424, 562.1, 524, 522; 370/341, 370/329, 332, 437; 342/373
See application file for complete search history.

(56) References Cited

U.S. PATENT DOCUMENTS 6,493,331 B1 * 12/2002 Walton et al. ................. 370/341
6,754,475 B1 * 6/2004 Harrison et al. ........... 455/115.1

(Continued)

FOREIGN PATENT DOCUMENTS

EP 1807991 B1 2/2008
JP 2010-004525 A 1/2010

OTHER PUBLICATIONS

Hatakawa, Yasuyuki et al., "Multi-Site Cooperative MIMO Transmission Technology—A Study of Precoding Scheme," Proceeding of the Society Conference of IEICE, The Institute of Electronics, Information and Communication Engineers, Sep. 1, 2009, pp. S-61 and S-62, BS-3-7 (with partial translation).

(Continued)

*Primary Examiner* — Sam K Ahn
*Assistant Examiner* — Fabricio R Murillo Garcia
(74) *Attorney, Agent, or Firm* — Brinks Gilson & Lione

(57) ABSTRACT

An apparatus for calculating receive parameters for an MIMO system including a plurality of individual transmission sections, a transmission section having a transmit circuit adjustable by a transmit parameter, and a plurality of individual users, a user having a receive circuit being adjustable by a receive parameter, includes a calculator for calculating a receive parameter for a first selected data stream for a first user of the plurality of users using a channel information for a transmission channel between the user and a first individual transmit section, to which the user is associated, and for calculating a receive parameter for a second selected data stream for a second user of the plurality of users associated with a second different individual transmission section using channel information between the first user and the second transmission section the second user is associated with, or using the calculated receive parameter for the first user.

16 Claims, 14 Drawing Sheets

(56) References Cited

U.S. PATENT DOCUMENTS

| | | | | |
|---|---|---|---|---|
| 6,947,502 | B2* | 9/2005 | Taylor et al. | 375/340 |
| 7,058,367 | B1* | 6/2006 | Luo et al. | 455/101 |
| 2003/0100329 | A1* | 5/2003 | Kwon et al. | 455/522 |
| 2007/0064829 | A1* | 3/2007 | Zheng et al. | 375/267 |
| 2008/0316099 | A1* | 12/2008 | Fujii | 342/373 |
| 2009/0274253 | A1* | 11/2009 | Krasny et al. | 375/347 |
| 2009/0296650 | A1* | 12/2009 | Venturino et al. | 370/330 |
| 2009/0323848 | A1* | 12/2009 | Guthy et al. | 375/267 |
| 2010/0290548 | A1* | 11/2010 | Hoshino et al. | 375/260 |

OTHER PUBLICATIONS

Guthy, Christian, "Low-Complexity Linear Zero-Forcing for the MIMO Broadcast Channel," IEEE Journal of Selected Topics in Signal Processing, vol. 3, No. 6, Dec. 2009, pp. 1106-1117.

Office Action from counterpart Korean Office Action No. 10-2011-0072073, dated Sep. 10, 2012, 9 pages (with translation).

Choi, Wan et al., "The Capacity Gain from Intercell Scheduling in Multi-Antenna Systems, IEEE Transactions on Wireless Communications," vol. 7, No. 2, Feb. 2008, pp. 714-725.

Dahrouj, Hayssam et al., "Coordinated Beamforming for the Multi-Cell Multi-Antenna Wireless System," IEEE, © 2008, pp. 429-434.

Das, Suman et al., "Dynamic Load Balancing Through Coordinated Scheduling in Packet Data Systems," IEEE, © 2003, pp. 786-796.

Foschini, G.J. et al., "Coordinating multiple antenna cellular networks to achieve enormous spectral efficiency," IEE Proc. Commun., vol. 153, No. 4, Aug. 2006, pp. 548-555.

Kimura, Ryota et al., "Multiple-QR-Decomposition Assisted Group Detection for Reduced-Complexity-and-Latency MIMO-OFDM Receivers," The 17$^{th}$ Annual IEEE International Symposium on Personal, Indoor and Mobile Radio Communications, 2006, 3 pages.

Shamai, Shlomo et al., "Enhancing the Cellular Downlink Capacity via Co-Processing at the Transmitting End," IEEE, © 2001, pp. 1745-1749.

Shang, Xiaohu et al., "On the Capacity of MIMO Interference Channels," IEEE, Forty-Sixth Annual Allerton Conference, Allerton House, UIUC, Illinois, USA, Sep. 23-26, 2008, pp. 700-707.

Shi, Changxin et al., "Distributed Interference Pricing for the MIMO Interference Channel," IEEE Communications Society, © 2009, 5 pages.

Vishwanath, Sriram et al., "Duality, Achievable Rates, and Sum-Rate Capacity of Gaussian MIMO Broadcast Channels," IEEE Transactions on Information Theory, vol. 49, No. 10, Oct. 2003, pp. 2658-2668.

Weingarten, Hanan et al., "The Capacity Region of the Gaussian Multiple-Input Multiple-Output Broadcast Channel," IEEE Transactions on Information Theory, vol. 52, No. 9, Sep. 2006, pp. 3936-3964.

Xiang, Yikang and Luo, Jijun, Siemens Networks GmbH & Co. KG and Hartman, Christian, Technical University of Munich, "Inter-cell Interference Mitigation through Flexible Resource Reuse in OFDMA based Communication Networks," date unknown, 7 pages.

Zhang, Jun, "Adaptive Spatial Intercell Interference Cancellation in Multicell Wireless Networks," Wireless Networking and Communications Group, Department of Electrical and Computer Engineering, University of Texas at Austin, date unknown, 26 pages.

Hatakawa, Yasuyuki et al., "Multi-Site Cooperative MIMO Transmission Technology—A Study of Precoding Scheme," Proceeding of the Society Conference of IEICE, The Institute of Electronics, Information and Communication Engineers, Sep. 1, 2009, pp. S-61 and S-62, BS-3-7.

Translation of Office Action from counterpart Japanese Application No. 2011-158787, dated Oct. 5, 2012, 4 pages.

Tejera, Pedro et al., "Rate Balancing in Multiuser MIMO OFDM Systems," IEEE Transactions on Communications, vol. 57, No. 5, May 2009, pp. 1370-1380.

European Communication from European Application No. 10170166.2, dated Jan. 4, 2013, 4 pages.

Guthy, Christian, et al., "Efficient Linear Successive Allocation for the MIMO Broadcast Channel," *Forty-Second Asilomar Conference on Signals, Systems and Computers*, Oct. 26-29, 2008, pp. 336-340.

Tejera, Pedro, et al., "Subchannel Allocation in Multiuser Multiple-Input-Multiple-Output Systems," *IEEE Transactions on Information Theory*, vol. 52, No. 10, Oct. 2006, pp. 4721-4733.

Communication in corresponding European Application No. 10 170 166.2, dated Aug. 27, 2013, 4 pages.

Office Action from counterpart Chinese Application No. 201110203372.0, dated Oct. 8, 2013, 21 pages.

* cited by examiner

Intra-Site $H_{12}$ : channel between
1st user ans 2nd TX section
$H_{13}$ : channel between
1st user and 3rd section
$H_{12}$, $H_{13}$ are
used, when $U_2$, ...
is allocated $U_1$ : 1st user
$S_1$ : 1st transmission section
$A^1$ : 1st sector antenna array $U_2$ : 2nd user
$S_2$ : 2nd transmission section
$A^2$ : 2nd sector antenne array

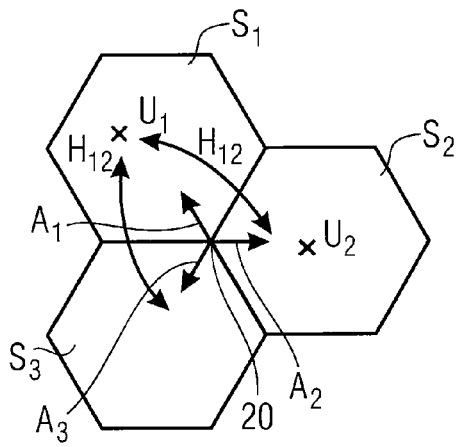

interference between different sections
is problematic for users positioned close
to cell edges and is to be reduced or eliminated

FIG 2A for single user (and single stream): only $RC_{21}$, $RC_{22}$, $RC_{23}$ and single combiner

- $P_1$, $P_3$ are based on cross-sector channel information
- $P_2$ is based on current sector channel information Input: $S, K, f: K \mapsto S, \{H_{ks}\}^{k \in K, s \in S}, \{P_s\}^{s \in S}, \sigma^2$
Output: D
m=1
$P_s^{(m)} = I, \forall s \in S$
while $m \leq M_{TX}$ do
$\quad \{\pi(m), u_m, v_m\} = \underset{k \in K, u, v}{\operatorname{argmax}} \; u^H H_{kf(k)} P_{f(k)}^{(m)} v \quad \leftarrow 50$
$\quad\quad\quad$ s.t. $\quad \|u\|_2, \|v\|_2 = 1$
$\quad D^{(m)} = D^{(m-i)} U(\pi(m), u_m, v_m, 0)$
$\quad$ for: $d \in D^{(m)}$ do
$\quad\quad v_d \leftarrow \underset{v}{\operatorname{argmax}} \; u_d^H H_{\pi(d), f(\pi(d))} v \quad\quad \swarrow 51$
$\quad\quad\quad$ s.t. $\quad u_e^H H_{\pi(e), f(\pi(d))} v = 0 \; \forall \; e \in D^{(m)} \backslash d$,
$\quad\quad\quad\quad\quad \|v\|_2 = 1$
$\quad$ end
$\quad D^{(m)} \leftarrow WF(D^{(m)})$
$\quad$ if $U(D^{(m)}) < U(D^{(m-1)})$ then
$\quad\quad$ break
$\quad$ else
$\quad\quad$ for $s \in S$ do
$\quad\quad\quad P_s^{(m+1)} = P_s^{(m)} - \dfrac{P_s^{(m)} H_{\pi(m)s}^H u_m u_m^H H_{\pi(m)s} P_s^{(m)}}{u_m^H H_{\pi(m)s} P_s^{(m)} H_{\pi(m)s}^H u_m} \quad \leftarrow 52$
$\quad\quad$ end
$\quad\quad m \leftarrow m+1$
$\quad$ end
end
return $D^{(m-1)}$ Algorithm 1: Multi-Cell LISA

FIG 5

```
Input: S, K, f : K ↦ S, {H_ks}^{k∈K, s∈S}, {P_s}^{s∈S}, σ²
Output: D
m=1
P_s^{c,(m)} = I, ∀ s ∈ S ∀ c ∈ C
for c ∈ C do
    for k ∈ K do
        {ū^{c,k}, v̄^{c,k}} = argmax  u^H H^c_{kf(k)} v
                              u,v
                         s.t.   ‖u‖₂, ‖v‖₂ = 1
        λ^{c,k} = (1/σ²) |u^{c,k H} H^c_{kf(k)} v^{c,k}|²
    end
end
while ∃ (c, k) ∈ C × K, λ^{c,k} > 0 do
    {ĉ, k̂} = argmax   P_{f(k)} / (|D_{f(k)}| + 1) · λ^{c,k}      ←—50a
             c∈C, k∈K
    (π(m), u_m, v_m) = (k̂, ū^{ĉ,k̂}, v̄^{ĉ,k̂})
    D^{(m)} = D^{(m-i)} ∪ (π(m), u_m, v_m, 0)
    for d ∈ D^{ĉ,(m)} do                                          ⎫51a
        v_d ← argmax  u_d^H H^{ĉ}_{π(d), f(π(d))} v
              v
              s.t.    u_e^H H^{ĉ}_{π(e), f(π(d))} v = 0 ∀ e ∈ D^{ĉ,(m)} \ d,
                      ‖v‖₂ = 1
    end
```

FIG 6A

FIG 6A | FIG 6B $D^{(m)} \leftarrow WF(D^{(m)})$ if $U(D^{(m)}) < U(D^{(m-1)})$ then
| break
else
| for $s \in S$ do
| | $P_s^{\hat{c},(m+1)} = P_s^{\hat{c},(m)} - \dfrac{P_s^{\hat{c},(m)} H_{ks}^{\hat{c}H} u_m u_m^H H_{ks}^{\hat{c}} P_s^{\hat{c},(m)}}{u_m^H H_{ks}^{\hat{c}} P_s^{\hat{c},(m)} H_{ks}^{\hat{c}H} u_m}$ ← 52a
| end
| for $k \in K$ do
| | $\{\overline{u}^{\hat{c},k}, \overline{v}^{\hat{c},k}\} = \underset{u,v}{\arg\max}\ u^H H_{kf(k)}^{\hat{c}} P_{f(k)}^{\hat{c},(m)} v$
| | s.t. $\|u\|_2\ \|v\|_2 = 1$
| | $\lambda^{\hat{c},k} = \dfrac{1}{\sigma^2}\left|\overline{u}^{\hat{c},kH} H_{kf(k)}^{\hat{c}} P_{f(k)}^{\hat{c},(m)} \overline{v}^{\hat{c},k}\right|^2$
| end
| $m \leftarrow m + 1$
end
end
return $D^{(m-1)}$

Algorithm 2: Multi-Cell LISA - Multiple Carriers

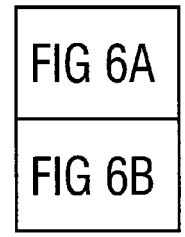

FIG 6B

```
Input: S, K, f : K ↦ S, {H_ks}^{k∈K, s∈S}, {P_s}^{s∈S}, σ²
Output: D
m=1
P_s^{(m)}=I, ∀ s ∈ S
for c ∈ C do
    for k ∈ K do
        {ū^{c,k}, v̄^{c,k}} = argmax  u^H H^c_{k f(k)} v
                              u, v
                     s.t.    ‖u‖_2, ‖v‖_2 = 1
        λ^{c,k} = (1/σ²) |u^{c,k H} H^c_{k f(k)} v^{c,k}|²
    end
end
while ∃ (c, k) ∈ C × K, λ^{c,k} > 0 do
    {ĉ, k̂} = argmax      P_{f(k)} / (|D_{f(k)}| + 1)  λ^{c,k}      ← 50a
              c∈C, k∈K
    (π(m), u_m, v_m) = (k̂, ū^{ĉ,k̂}, v̄^{ĉ,k̂})
    D^{(m)} = D^{(m-i)} U (π(m), u_m, v_m, 0)
    for d ∈ D^{ĉ,(m)} do
        ε_d^{(m)} = {e ∈ D^{ĉ,(m)}\d : ‖u_e^H H_{π(e), f(π(d))}‖_2² > α}
        v_d = argmax  u_d^H H_{π(d), f(π(d))} v                      ← 51a
                v
              s. t.  u_e^H H_{π(e), f(π(d))} v = 0 ∀ e ∈ ε_d^{(m)}
                     ‖v‖_2 = 1,
    end
```

FIG 7A $D^{(m)} \leftarrow WF(D^{(m)})$ if $U(D^{(m)}) < U(D^{(m-1)})$ then
| break
else
| for $s \in S$ do
| | $P_s^{(m+1)} = $
| | $\begin{cases} P_s^{\hat{c},(m)} - \dfrac{P_s^{\hat{c},(m)} H_{ks}^{\hat{c}H} u_m u_m^H H_{ks}^{\hat{c}} P_s^{\hat{c},(m)}}{u_m^H H_{ks}^{\hat{c}} P_s^{\hat{c},(m)} H_{ks}^{\hat{c}H} u_m} & \text{if } \|u_m^H H_{ks}^{\hat{c}}\|_2^2 \geq \alpha \\ P_s^{\hat{c},(m)} & \text{if } \|u_m^H H_{ks}^{\hat{c}}\|_2^2 < \alpha \\ 0 & \exists\, d \in D^{\hat{c},(m)}, |\mathcal{E}_d| = M_{TX}-1 \end{cases}$     52b
| end
| for $k \in K$ do
| | $\{\overline{u}^{\hat{c},k}, \overline{v}^{\hat{c},k}\} = \underset{u,v}{\arg\max}\ u^H H_{kf(k)}^{\hat{c}} P_{f(k)}^{\hat{c},(m)} v$
| | s.t.  $\|u\|_2, \|v\|_2 = 1$
| | $\lambda^{\hat{c},k} = \dfrac{1}{\sigma^2} \left| \overline{u}^{\hat{c},kH} H_{kf(k)}^{\hat{c}} P_{f(k)}^{\hat{c},(m)} \overline{v}^{\hat{c},k} \right|^2$
| end
| $m \leftarrow m + 1$
end
end
return $D^{(m-1)}$ Algorithm 3: Multi-Cell LISA with Threshold

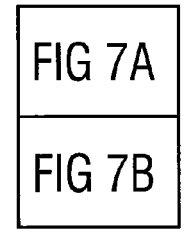

FIG 7B

APPARATUS AND METHOD FOR CALCULATING RECEIVE PARAMETERS FOR AN MIMO SYSTEM

RELATED APPLICATIONS

This application claims priority under 35 U.S.C. §119 to European Patent Application No. 10170166.2 filed on Jul. 20, 2010, the entire content of which is hereby incorporated by reference.

BACKGROUND OF THE INVENTION

The present invention relates to a digital communication application, and particularly, to the linear successive user allocation in a multi-cell MIMO (MIMO=multiple inputs multiple outputs) environment.

In a downlink of a cellular network information is transmitted with multiple transmit antennas to users equipped with multiple receive antennas (MIMO). Multi-carrier (OFDM) transmission can also be employed. In the downlink of a cellular system, inter-cell interference (ICI) can be a severely limiting factor, especially users at the cell edge are affected and might be excluded from network service.

A possible solution to completely eliminate ICI is the joint encoding of information over multiple base stations (G. J. Foschini, K. Karakayali, and R. A. Valenzuela. Coordinating multiple antenna cellular networks to achieve enormous spectral efficiency. *Communications, IEE Proceedings-*, 153(4): 548-555, August 2006, S. Shamai and B. M. Zaidel. Enhancing the cellular downlink capacity via co-processing at the transmitting end. *Vehicular Technology Conference, 2001. VTC 2001 Spring. IEEE VTS 53rd*, 3:1745-1749 vol. 3, 2001), so-called network MIMO. Joint encoding over geographically distributed antennas renders the network into a super-cell, which is related to the MIMO broadcast scenario (S. Vishwanathan, N. Jindal, and A. Goldsmith. Duality, achievable rates, and sum-rate capacity of Gaussian MIMO broadcast channels. *IEEE Trans. Inf. Theory*, 49(10):2658-2668, October 2003, H. Weingarten, Y. Steinberg, and S. Shamai. The capacity region of the Gaussian multiple-input multiple-output broadcast channel. *IEEE Trans. Inf. Theory*, 52(9): 3936-3964, September 2006). In case full channel state information (CSI) and all data is available at a central controller, network MIMO can efficiently exploit all spatial degrees of freedom to eliminate ICI. Although the network's performance is no longer limited by interference, there is a huge amount of additional complexity compared to single cell signal processing. Additionally, network MIMO involves a backhaul with high capacity and low delay in order to exchange the CSI of all users. Furthermore, joint encoding relies on coherent transmission of all antenna arrays, which necessitates perfect synchronization in the network that might be difficult to implement in practice. Therefore, methods aiming at elimination of interference by cooperation of the base stations, while every user is served by a single base station, are attractive for deployable networks.

In order to cancel interference, user signals are orthogonalized in the available signal space constituted by the available resources, for example time, frequency, and space. A simple scheme that completely removes ICI is to exclusively allocate carriers to base stations and apply any single cell algorithm on the allocated carriers, which corresponds to the classical frequency reuse planning, a very simple form of interference management. Besides the poor spectral efficiency, frequency reuse partitioning leaves out the opportunity for cooperation in the spatial domain. The availability of multiple antennas at transmitter and receiver allows to serve multiple users interference free at the same time on the same frequency by spatial multiplexing. Interference coordination by adjusting the transmission space of each user is well understood and can be solved optimally for a single cell (S. Vishwanathan, N. Jindal, and A. Goldsmith. Duality, achievable rates, and sum-rate capacity of Gaussian MIMO broadcast channels. *IEEE Trans. Inf. Theory*, 49(10):2658-2668, October 2003, H. Weingarten, Y. Steinberg, and S. Shamai. The capacity region of the Gaussian multiple-input multiple-output broadcast channel. *IEEE Trans. Inf. Theory*, 52(9):3936-3964, September 2006). In conventional cellular network design, signal processing in the spatial domain is only performed per cell, but interesting research towards extending spatial multiplexing over multiple base stations is emerging. There is a huge variety of work concerning interference management in cellular systems where the base stations have multiple antennas and the receivers are equipped with a single antenna (MISO). First steps into coordinating the transmission spaces used by each cell are proposals that perform a joint decision on the users to schedule (Wan Choi and J. G. Andrews. The capacity gain from intercell scheduling in multi-antenna systems. *IEEE Trans. Wireless Commun.*, 7(2): 714-725, February 2008, Suman Das, Harish Viswanathan, and G. Rittenhouse. Dynamic load balancing through coordinated scheduling in packet data systems. In *Proc. Twenty-Second Annual Joint Conference of the IEEE Computer and Communications Societies, INFOCOM* 2003., volume 1, pages 786-796 vol. 1, March-3 April 2003), where at each time slot only a single user per cell is active. Each user is served using a transmit filter matched to the MISO channel and by the joint scheduling decision transmit filters are combined such that interference is reduced. Clearly, it might be advantageous to select transmit filters that are not optimal for the user, but reduce the interference caused to other users (Zhang and J. G. Andrews. Adaptive Spatial Intercell Interference Cancellation in Multicell Wireless Networks. *Arxiv preprint arXiv:*0909.2894, 2009, H. Dahrouj and Wei Yu. Coordinated beamforming for the multi-cell multi-antenna wireless system. In *Proc. 42nd Annual Conference on Information Sciences and Systems, CISS* 2008., pages 429-434, March 2008). Coordinated transmission strategies for full MIMO systems are mainly available for smaller scenarios, for example two or multiple interfering point-to-point transmissions (Xiaohu Shang, Biao Chen, G. Kramer, and H. V. Poor. On the capacity of MIMO interference channels. In *Communication, Control, and Computing,* 2008 *46th Annual Allerton Conference on*, pages 700-707, September 2008, Changxin Shi, D. A. Schmidt, R. A. Berry, M. L. Honig, and W. Utschick. Distributed interference pricing for the MIMO interference channel. In Proc. IEEE International Conference on Communications, ICC 2009., pages 1-5, June 2009). For the specific scenario regarded, a network with multiple antennas employed at the transmitters and receivers, good base station cooperation schemes that use all available degrees of freedom, including the spatial domain, are not available so far.

In a successive user allocation which is performed sector by sector, the base station controller typically has available the full MIMO channel from each user to the transmission section in the sector, i.e. to the transmission antenna array having a plurality of transmission antennas. This channel information can be measured or estimated in a blind or guided channel estimation process. Now, when the base station controller is aware of the channel information between each user and the transmitter antenna array, the base station controller performs a calculation in order to find out a first user which is to be allocated to first data stream. Typically, the user having the best transmission channel is selected, but other criteria can be used as well. The best user means in this context the user having the highest data throughput or data rate. When this user is identified, the transmit parameters for the individual transmit circuits which are associated with each antenna in the transmitter antenna array are calculated. The same is performed for the receive circuits associated with the individual receiver antennas attached to the corresponding user. Based on the selected user, the channel information for all remaining users is updated as known in successive MIMO processing, and in the next allocation step, the next user is determined in this individual sector, where the next user is again the user allowing the highest data rate under the assumption that the first allocated user is not disturbed by the transmission to the second user.

Additionally, the transmit parameters for the transmitter antennas in the transmitter antenna array and the receive parameters for the receiver circuits in the receiver antenna array attached to the user are calculated. This successive procedure is performed until the determination criterion is reached, which is, for example, that all users that are in the sector are satisfied. An alternative criterion is that a minimum data rate for a certain user cannot be guaranteed anymore due to the fact that in a certain sector only a small number of MIMO channels exist. When, for example, it is considered that there are five users positioned at nearly the same geographical position, then the chances are reduced that five orthogonal MIMO channels can be found for all five users. Stated differently, the chances will be higher to find five orthogonal MIMO channels to five users, when the five users are positioned at different places in the sector. Additionally, the chances of finding enough MIMO channels within the sector are higher when the users are distributed in the sector so that the distance between the individual users and the transmitter array is not extremely different. When, for example, it is considered that one user is standing very close to the base station, a very good channel can be expected, but this very good channel might have significant negative impact for the other users in the cell in that only quite bad spatial channels can be calculated for these other users.

In a multi-cell environment, where for example, a base station has three directional antenna arrays where each directional antenna array defines one sector, a single base station will serve three sectors, where these three sectors are adjacent to each other.

When the successive user allocation is performed for each sector individually, any interferences from one sector to the other or from one cell to the other will degrade the situation particularly for users which are positioned at cell boundaries. This, however, can be significantly different depending on the actual situation in a sector, i.e. which users have been allocated which data streams and which users have associated transmit circuit parameters in the receive and transmit antenna arrays. Anyway, potential interference will result in the situation that it would have been better to allocate a stream to a different user which is not positioned close to the boundary between sectors although the user positioned at a boundary between two sectors seems to have a better channel due to the fact that the user positioned more in the middle of the sector does not suffer from an inter-cell interference from the neighboring sector. Due to the fact, however, that the inter-cell interference affected user actually received her or his channel, but is interfered from the neighboring sector, the whole data rate situation in a current sector is clearly sub-optimum, since the base station controller performing the successive user allocation has actually ignored the fact that a sector is not completely isolated from a neighboring sector, but in fact is positioned close to the sector and that there are inter-sector dependencies.

On the other hand, a non-successive user allocation in a large network could also be performed by considering all interferences, but this procedure turns out to be extremely complicated and necessitates extremely high computation resources particularly in the situation where there are many different cells and where there are quite a number of users in each cell as is, for example, the case in urban areas where there are small cells, many users in each cell and due to the small size of the cells, a high possibility for significant amount of users positioned at cell boundaries. Furthermore, such a fully network-wide user allocation processes would necessitate an enormous effort of inter base station communication. Basically, every base station in the network would have to be connected to every other base station in the network by a low delay communication scheme so that the enormous amount of channel information from all users to all transmitters in all network sectors can be distributed over the network. Furthermore, the distribution of the transmit parameters to the transmit antenna arrays of all base stations in the network and the distribution of the receive parameters to all users in the network from the central allocation processor is also a task which necessitates significant resources for computation and distribution.

SUMMARY OF THE INVENTION

According to an embodiment, an apparatus for calculating receive parameters for an MIMO system having a plurality of individual transmission sections, a transmission section having a transmit circuit being adjustable by a transmit parameter, and a plurality of individual users, a user having a receive circuit being adjustable by a receive parameter may have: a calculator for calculating a receive parameter for a first selected data stream for a first user of the plurality of users using a channel information for a transmission channel between the user and a first individual transmission section, to which the user is associated, and for calculating a receive parameter for a second selected data stream for a second user of the plurality of users associated with a second different individual transmission section using a channel information between the first user and the second individual transmission section, to which the second user is associated with, or using the calculated receive parameter for the first user, wherein an interference caused by a transmission of an individual transmission section at a user in a different transmission section is reduced or eliminated.

According to another embodiment, a method of calculating receive parameters for an MIMO system having a plurality of individual transmission sections, a transmission section having a transmit circuit being adjustable by a transmit parameter, and a plurality of individual users, a user having a receive circuit being adjustable by a receive parameter may have the steps of: calculating a receive parameter for a first selected data stream for a first user of the plurality of users using a channel information for a transmission channel between the user and a first individual transmission section, to which the user is associated; and calculating a receive parameter for a second selected data stream for a second user of the plurality of users associated with a second different individual transmission section, wherein a channel information between the first user and the second transmission section, to which the second user is associated with, or the calculated receive parameter for the first user is used in calculating the receive parameter for the second selected data stream for the second user, where an interference caused by a transmission of an individual transmission section at a user in a different transmission section is reduced or eliminated.

According to another embodiment, a computer program for performing, when being executed on a processor, a method of calculating receive parameters for an MIMO system having a plurality of individual transmission sections, a transmission section having a transmit circuit being adjustable by a transmit parameter, and a plurality of individual users, a user having a receive circuit being adjustable by a receive parameter, which method may have the steps of: calculating a receive parameter for a first selected data stream for a first user of the plurality of users using a channel information for a transmission channel between the user and a first individual transmission section, to which the user is associated; and calculating a receive parameter for a second selected data stream for a second user of the plurality of users associated with a second different individual transmission section, wherein a channel information between the first user and the second transmission section, to which the second user is not associated with, or the calculated receive parameter for the first user is used in calculating the receive parameter for the second selected data stream for the second user, where an interference caused by a transmission of an individual transmission section at a user associated with a different transmission section is reduced or eliminated.

The present invention is based on the finding that a successive user allocation provides an efficient way to the solution of user allocation and transmit/receive parameter calculation for an MIMO system. The problem with inter-cell interference, however, has to be accounted for in such a way that for the calculation of receive parameters for a second data stream for a second user positioned in a second different individual transmission section, the channel information between the first user and the second transmission section, to which the second user is associated with, and/or the calculated receive parameter(s) for the first user which has(have) been calculated before, is(are) to be used.

Advantageously, a small group of sectors such as nine or 21 sectors associated with, for example, three or seven adjacent base stations, or even only 3 sectors associated with a single base station, are considered together. Then, a successive user allocation is performed within this group of sectors rather than in a sector alone. In the user allocation, however, the impact of an already associated user which is, of course, "linked" with the transmitter section for this sector on all MIMO channels of the other sectors in the considered group of sectors are taken into account when the next user in the group of sectors is to be determined.

Advantageously, the receive parameter for a user is calculated together with the identification of the user using the channel information for the user in its corresponding sector. When, however, this user is not the first one, but before another user in one of the sectors has been allocated, the influence of this early allocated user is accounted for by a projector matrix which is to be combined to the channel matrix each user has to its associated antenna array, i.e. to each individual sector. Importantly, the general association of the user to a sector is done by the geographical sector areas and is not changed by the inventive allocation process. But, the association of an earlier located user in a different sector is considered by the projector matrix, since the projector matrix depends on channel information on a channel from the first (already allocated) user to the transmission section of the section of a user currently under consideration for allocation.

Then, as soon as the receive parameters for a user are determined, a projector matrix containing the influence of this user to the other sectors, i.e. to the MIMO channels in the sectors, is calculated. Then, in the next allocation step, these projector matrices are used where such a projector matrix may be used for each sector, but not for each user. This means that there is a considerable saving due to the fact that projector matrices are not necessary for each user but only for each sector.

In order to increase the data rate or quality further, only the receive parameters are kept fixed, but the transmit parameters for the transmit circuits associated with the transmit antenna array for each sector are continuously updated and are therefore only determined or output in the end, i.e. when all users in the group of sectors are allocated and have received their receive parameters. This strategy, i.e. successively calculating the receive parameters and keeping the receive parameters fixed, but in a sense, letting the transmit parameters vary so that the transmit parameters for the individual sector antenna arrays and users in the group of sectors are only finally determined when the successive allocation is completed is based on the rational that this allows the reduction of interferences of the transmission to a later-allocated user on the earlier allocated users. Additionally, this strategy has the advantage that the inventive operators for calculating will typically be positioned in base stations or close to base stations so that the receive parameters which actually have to be transmitted to the individual MIMO users in the sector are fixed and finally calculated early in the processing and can be transmitted to the individual users in parallel to the next allocation procedure. Finally, the late determination of the transmit parameters is in a sense non-problematic due to the fact that the way from the transmit parameter calculator to the actual transmit circuits is short. The transmit circuits are positioned in the base station anyway and the apparatus for calculating the transmit parameters in the end of the successive allocation procedure is positioned in the base station or very close to the base station as well.

BRIEF DESCRIPTION OF THE DRAWINGS

Embodiments of the present invention will be detailed subsequently referring to the appended drawings, in which:

FIG. 2A is a diagram illustrating the situation of a single base station serving three sectors using directional antenna arrays;

FIG. 5 illustrates a detailed implementation of a multi-cell linear successive allocation algorithm (LISA);

FIG. 6 illustrates a further detailed implementation of an allocation for a multi-cell LISA and a multiple carriers;

FIG. 7 illustrates another implementation of a multi-cell LISA algorithm with threshold.

DETAILED DESCRIPTION OF THE PREFERRED EMBODIMENTS

Figure 1:
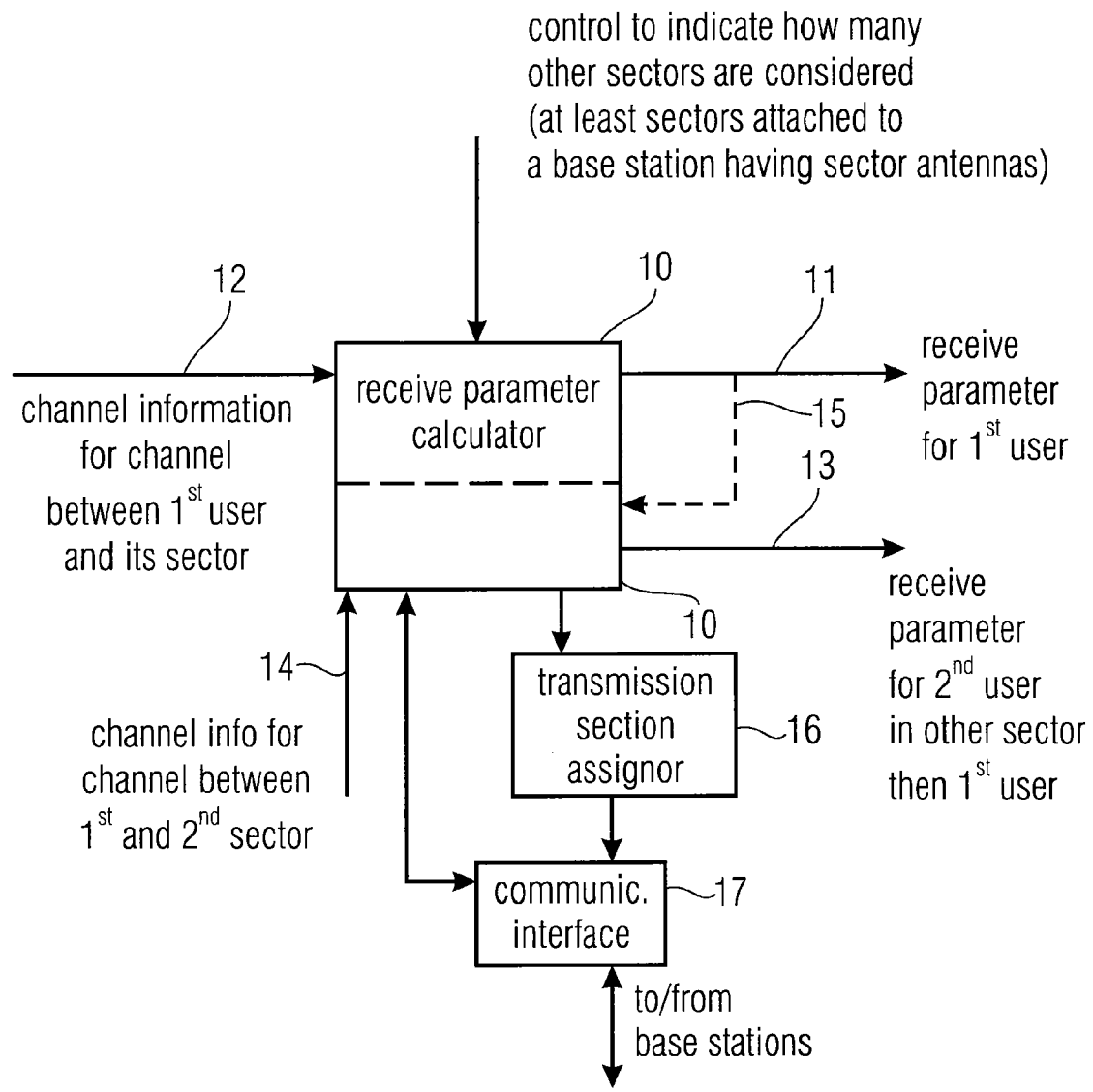
FIG. 1 is a block diagram of an apparatus for calculating receive parameters.

Embodiments relate to an interference management method for coordinating downlink transmission in a MIMO OFDM cellular network. By choosing linear transmit and receive filters for each data stream, interference is either completely avoided or kept bellow a certain threshold. The data streams transmitted are determined by a network wide successive allocation, inspired by the Linear Successive Allocation (LISA). In a nutshell, the LISA algorithm (C. Guthy, W. Utschick, and G. Dietl. Low Complexity Linear Zero-Forcing for the MIMO Broadcast Channel accepted for publication in IEEE Journal of Selected Topics in Signal Processing, special issue on Managing Complexity in Multiuser MIMO Systems, December 2009, C. Guthy, W. Utschick, G. Dietl, and P. Tejera. Efficient Linear Successive Allocation for the MIMO Broadcast Channel. In *Proceedings of 42nd Asilomar Conference on Signals, Systems, and Computers*, October 2008) is a zero-forcing beamforming scheme developed for an isolated MIMO broadcast system. In a first stage, the LISA algorithm performs a heuristic data stream allocation by successively adding the user that leads to the maximum increase in sum-rate, while being orthogonal to the previously allocated streams. The receive beamforming vectors found by the stream allocation are kept fixed and the transmit beamforming vectors of the resulting MISO system are chosen under a zero-forcing constraint. The power allocation for the interference free scalar subchannels is found via waterfilling.

In embodiments every user is served by a single base station and base stations cooperate by jointly adjusting the transmission space of each stream in order to eliminate or reduce interference. The LISA principle is extended to base station cooperation in the spatial signal domain and is henceforth called multi-cell LISA. When allocating the data streams, assuring orthogonality to the previously assigned streams is done by projecting the channel matrix such that the new transmit filter vector is orthogonal to the composite cross-channels of the other streams. The composite cross-channel of a stream is constituted by the cross-channel matrix and the corresponding receive filter. Clearly, these cross-channels are different at each cell and it is advantageous to maintain a projector matrix for every cell, which however can be updated sequentially.

Depending on the network regarded, complete cancellation of interference by zero-forcing is not desired as it drastically reduces the number of data streams transmitted. Two strategies to circumvent this problem are shown, one is a clustered version of the algorithm, where cooperation only is done within a certain set of cells. The other one is version of the algorithm based on an interference threshold, where interference is not completely removed but kept below a certain level. This threshold can be connected to the availability of channel state information on the cross channels. Finally, a modification is disclosed that allows to include assignment of the users to cells, which is not obvious for users at the cell edge.

Main features of embodiments therefore are:

Coordination of transmission strategies for a full MIMO cellular network

Cooperation including the spatial domain by selecting receive and transmit filters Complete elimination of interference or control of the amount of interference tolerated Embodiments relate to interference management methods for coordinating downlink transmission in a Multiple-Input Multiple-Output (MIMO) cellular network, assuming that Orthogonal Frequency Division Multiplexing (OFDM) is employed. The problem is to efficiently manage inter-cell interference in a multi-cell environment, by so-called base station cooperation, in order to reduce the diminishing effects of interference on the network's performance. Embodiments calculate linear transmit and receive filters for each data stream, such that interference is either completely avoided or kept bellow a certain threshold. A network wide successive allocation of data streams is employed, inspired by the Linear Successive Allocation (LISA) developed for the single cell broadcast scenario.

The apparatus for calculating receive parameters for an MIMO system and the related method and computer program advantageously comprise a method for linear successive user allocation in the multi-cell MIMO environment. The advantageous process exploits multiple antennas for inter-cell interference coordination. Additionally, more than one antenna at a receiver is allowed, so that the inventive process can be applied to general MIMO systems. Advantageously, for the purpose of having low computational resources on the one hand and a good overall data rate on the other hand, the design of user selection, stream allocation and transmission strategies are combined. Furthermore, the present invention finds an efficient way to combine two issues, where on issue is that due to the geographical location of users, the users are associated with a single sector only, but the other issue relates to the fact that there are inter-sector influences.

Advantageously, an interference management method to coordinate downlink transmission in an MIMO cellular network is performed, where the selection of linear receive and transmit filters for each data stream is performed such that interference is efficiently managed. The linear receive and transmit filters are positioned in receive or transmit circuits which are adjustably by transmit parameters, where the transmit parameters are advantageously complex-valued, i.e. they control the filters in such a way that at least a gain modification by the magnitude of a complex filter parameter is performed, and where in addition, a delay or phase modification of the data stream for an antenna is performed in accordance with the phase of the transmit or receive parameter. Naturally, the transmit or receive parameters can also be given as complex-valued numbers having a real part on the one hand and an imaginary part on the other hand, where the real part and the imaginary part collectively perform a modification and phase/delay modification.

An utilization of multiple antennas to reduce or completely nullify interference caused by transmission of other users is performed. The present invention can be applied for a network-wide, but advantageously cluster-wide successive allocation of data streams inspired by the Linear Successive Allocation (LISA) algorithm. The cluster-wise successive allocation is advantageous over the network-wide approach due to the fact that channel information and transmit/receive parameter information only has to be distributed within a cluster comprising at least two sectors rather than over the whole network. An advantageous cluster comprises the transmitter sections associated with a couple of adjacent base stations such as eight adjacent base stations which are obtained in a situation, in which there is a web-like organization of cells. Each cell is a cell having six corners, where each base station serves three sectors or cells. Alternatively, a cluster might comprise only three sectors, so that any distribution of information does not have to take place at all among base stations, since the base station is arranged at the position of three adjacent cells as discussed later on.

In the down-link of a cellular system, inter-cell interference can be a severely limiting factor, and, in accordance with the present invention, the interference processes are coordinated at the transmitters, and a cooperation of the transmitters within a cluster or within the whole network is performed when choosing their transmission strategies. No joint encoding is performed, since this has turned out to be too complex. A feature is the definition of an operating point of a network where several assumptions are taken. The operating point of the network is defined by a set of data streams, where each data stream is defined by the associated user ($\pi$), a linear transmit filter v, a linear receive filter u, and the power allocation p. The data rates of the streams mutually depend on each other due to limited shared resources and the interference.

Finding the optimal data stream within a cluster or even more within a complete network-wide implementation has been found to be computationally highly demanding. Therefore, in accordance with the embodiments of the invention, a joint successive user allocation is performed, where receive parameters for a first user associated with a first sector is performed and, subsequently, receive parameters for a second user are calculated based on the channel between the first user and the transmission section of the second user and/or the receive parameters calculated before for the first user.

Generally, the most promising stream is added to the data stream set, and this user allocation and the receive filter are kept fixed. Then, the transmit filters and power allocations of all precedingly allocated streams are updated. This procedure stops, if a new stream does not improve performance with respect to data rate or with respect to other criteria such that quality of service constraints, available power sources, available delay constraints.

For the purpose of complete elimination of interference, transmit filters are chosen under a zero-forcing constraint, and the number of data streams in the network is limited to the number of antennas at each sector multiplied by the number of carriers. The gain of interference-free communication is smaller than the loss by serving fewer users. The clustered cooperation relates to sectors at the same site or opposite sectors relating to two adjacent base stations or all sectors associated with seven adjacent base stations. In a non-orthogonal version, a certain amount of orthogonality between the MIMO channels is searched, but these channels do not necessarily have to be completely orthogonal, so that only an interference above a threshold is eliminated.

In a per site-intra-site corporation, where a site is related a base station, the interference management is limited to the sectors at the same site. This results in large gains for users close to a site and in gains for edge users, i.e., users positioned at the edge between two sectors. Furthermore, the sum-rate utility is enhanced and, importantly, any inter-site (inter-base station) communication is not required.

In a cooperation between opposite sectors, i.e., in an inter-site communication, interference management within a set of three opposite sectors is performed. Reasonable gains for edge users are obtained. Furthermore, this procedure assists in an important feature that edge users are not excluded from service at all. Some inter-site communication is necessitated, i.e., between the base stations included in this cluster.

In a network-wide cooperation, it is advantageous to only perform an interference above a threshold. However, the interference management of interference above a threshold only can also be applied to intra-site or inter-site schemes as well. Large gains for users close to a site and reasonable gains for edge users can be achieved, and a full inter-site communication is necessitated, which results in an increased complexity with respect to a clustered operation of inter-site or intra-site schemes.

A typical setup may conclude 19 sites placed in a hexagonal grid, where three sectors exist per site. The inter-site distance can be, for example, 500 meters. A wrap-around configuration is assumed and a channel model according to three GPP TR 36.814 is applied (urban macro-cell). A four-by-four MIMO configuration can be assumed, which means that the transmitter antenna array has four transmitter antennas arranged at different positions, and the receiver antenna array has four receiver antennas placed at four positions as well. Furthermore, an OFDM (orthogonal frequency division multiplex) scheme of 16 OFDM carriers can be considered for simulation purposes, but in a true implementation, a single frequency system or a much higher OFDM system can be applied. Furthermore, for simulation purposes, 800 users uniformly distributed in the covered area have been considered.

Figure 8:
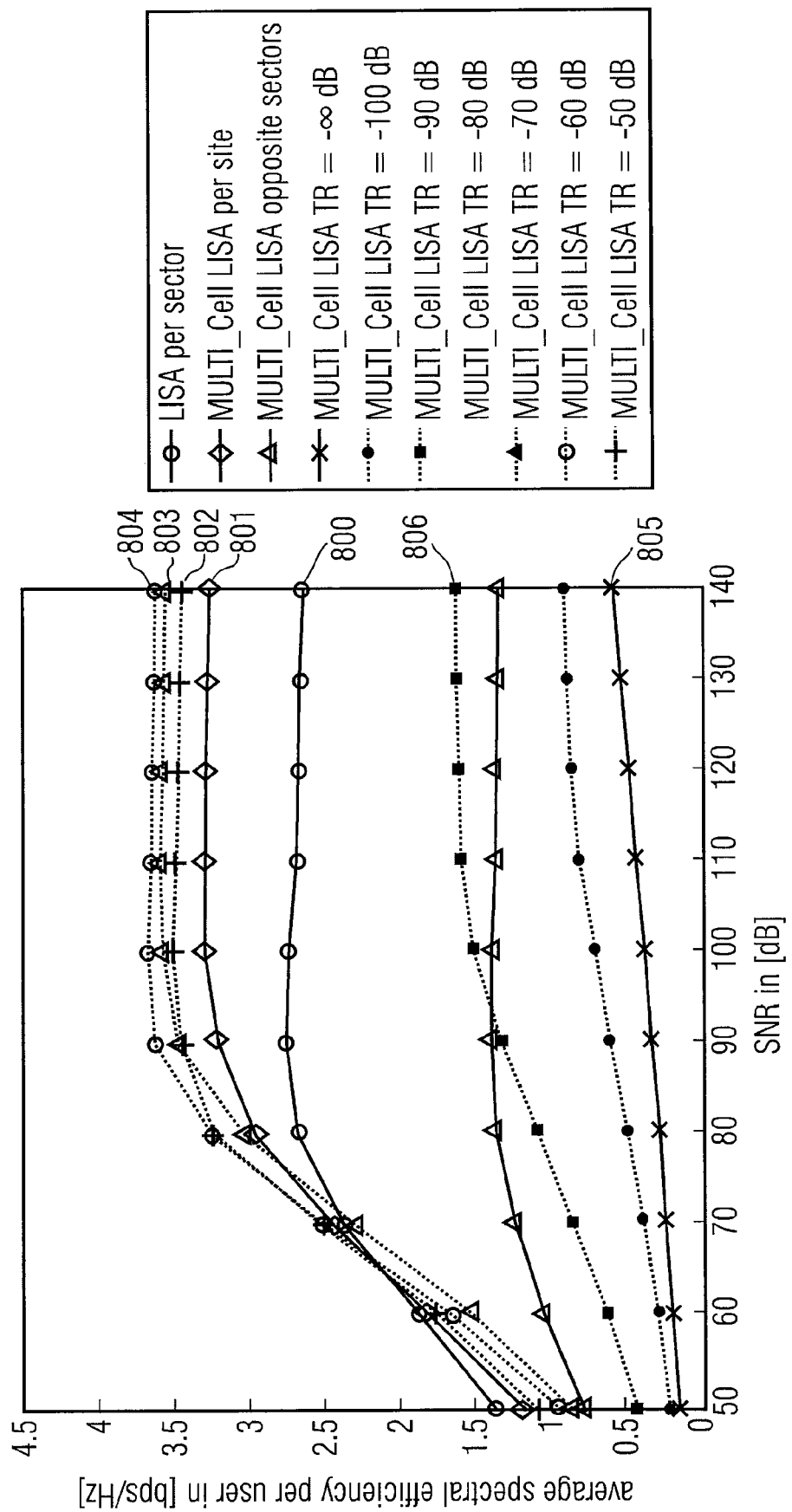
FIG. 8 illustrates simulation results for several implementations.

FIG. 8 illustrates a simulation result based on these parameters, from which it becomes clear that performing an LISA per sector illustrated at 800 is inferior to performing a multi-cell LISA per site illustrated at 801 or a multi-cell LISA using an interference threshold of −50 dB at 802 or a multi-cell LISA with an interference threshold of −70 dB illustrated at 803 or a multi-cell LISA algorithm as an interference threshold of −60 dB illustrated at 804. Performing an LISA algorithm per sector is, when a zero-interference is desired, better than a multi-cell LISA with no interference allowed illustrated at 805 or, for example, an allowed, but very low interference threshold of −90 dB illustrated at 806. It has furthermore been found that multi-cell LISA per site (intra-site) comprising, for example, three sectors results in an increase of the performance for the sum-rate and is particularly useful with respect to the low overhead, since any transmission between base stations is not required at all.

The multi-cell LISA procedure for opposite sectors, i.e., for a cluster with oppositely arranged base stations or sectors attached to these base stations results in a considerable advantage for cell-edge users, which cannot be seen from FIG. 8. A multi-cell LISA with an allowed interference threshold is particularly useful for the increase in the sum-rate, hence for the user's position at cell edges and necessitates, depending on the size of the cluster, more or less overhead and complexity.

However, the present invention offers an increased sum-rate resulting in higher billable performance throughput, which is particularly useful for cell-edge users, which are considerably "punished", when only an LISA allocation per sector is performed.

The present invention therefore, jointly determines the stream allocation and transmission settings for general MIMO networks such that interferences are managed efficiently by using cooperation in the spatial domain.

FIG. 1 illustrates an implementation of an inventive apparatus for calculating the received parameters for an MIMO system comprising a plurality of individual transmission sections, where a transmission section has a transmit circuit being adjustable by a transmit parameter, and a plurality of individual users, a user having a receive circuit being adjustable by a receive parameter. The apparatus comprises a receive parameter calculator 10 for calculating a receive parameter 11 for a first selected data stream for the first user of a plurality of users using a channel information 12 for a transmission channel between the user and the first individual transmit section to which the user is associated, and for calcalculating a receive parameter for a second selected data stream indicated at 13 for a second user of the plurality of users associated with a second different individual transmission section using a channel information 14 between the first user and the second transmission section, to which the second user is associated with, and to which the first user is not associated with. Alternatively or additionally, the receive parameter for the first user illustrated at 11 is used for the calculation of the receive parameter 13 as well, which is illustrated by the feedback line 15. Calculation is performed with the result that an interference caused by a transmission of the second individual transmission section for communicating with the second user, which is existing at the first user associated with the first individual transmission section or an interference caused by a transmission of the first individual transmission section for communicating with the first user, which is existing at the second user associated with the second individual transmission section is reduced or eliminated.

FIG. 2A illustrates a situation for a single base station 20 having three directional antenna arrays $A_1$, $A_2$ and $A_3$, where each antenna array $A_1$ to $A_3$ serves an individual sector $S_1$, $S_2$ or $S_3$. The situation for two users is illustrated, i.e., for the first user $U_1$ and the second user $U_2$, which are positioned in different transmission sections. The interference between different sections is particularly problematic for users positioned close to cell edges and is to be reduced or eliminated. However, users within a section can also be influenced by interference from transmissions in a neighboring section. Hence, an interference existing at user $U_2$ in second sector $S_2$ due to a transmission from the transmission antenna $A_1$ to the user $U_1$ or the other interference existing at user $U_1$ in sector $S_1$ due to a transmission of the second antenna array $A_2$ to the second user $U_2$ is reduced or eliminated due to the fact that in the calculation of the receive parameters for the users the channel between user $U_2$ and the first antenna $A_1$ or the channel between user $U_1$ and the second antenna $A_2$ ($H_{12}$) or a precedingly calculated receive parameter are considered and used within the calculation. When a third user would be in the third sector, an allocation process would also consider the channel ($H_{13}$) between user $U_1$ and a third antenna of the third sector or section.

Figure 2B:
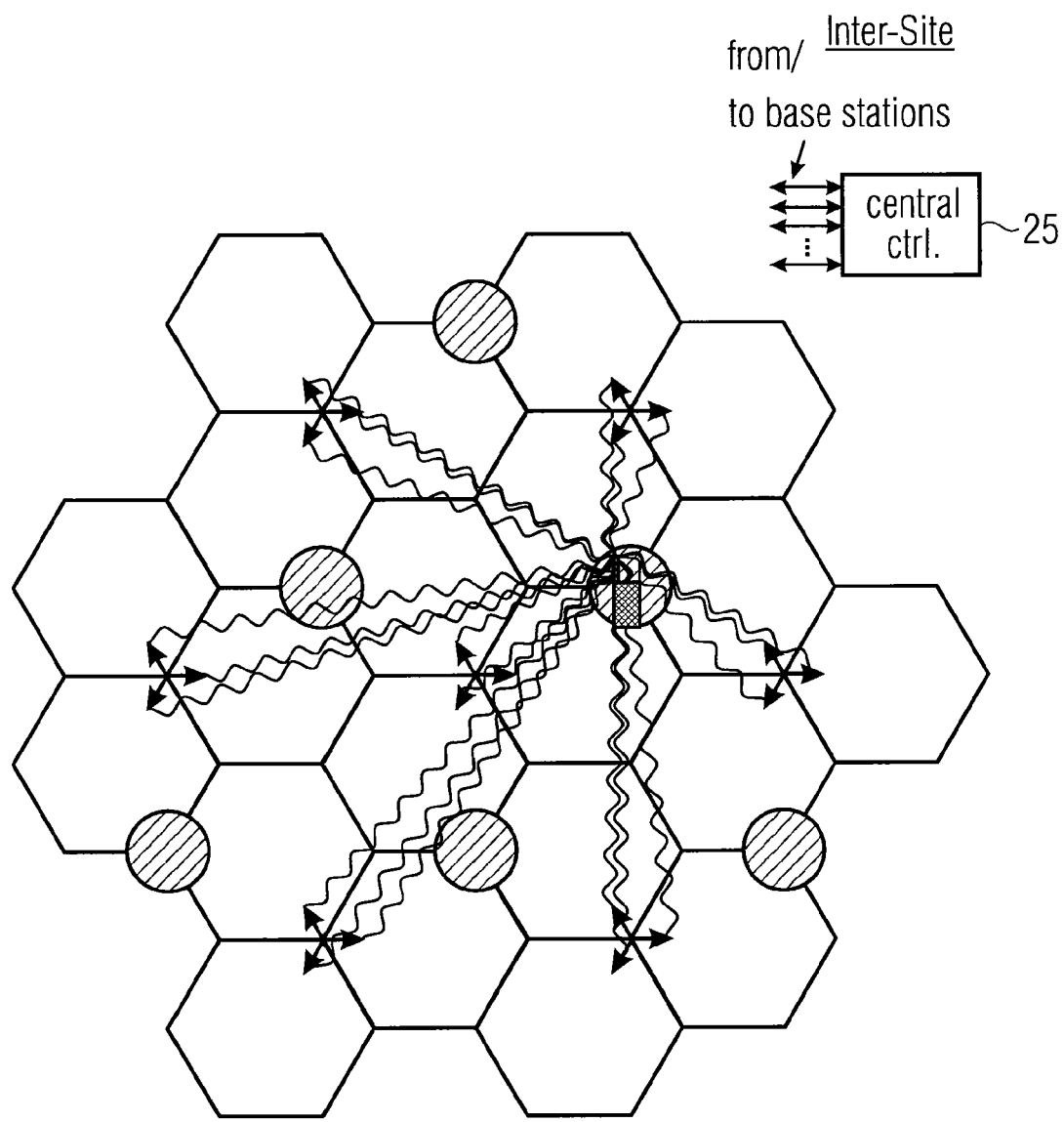
FIG. 2B is a diagram illustrating the situation of a cluster of base stations each serving three sectors using directional antenna arrays.

While FIG. 2A illustrates an intra-site application of the invention, FIG. 2B illustrates in inter-site implementation of the invention where the selection of sectors which are jointly processed is not three as illustrated in FIG. 2A, but is 21, and the number of base stations (sites) which should communicate to each other is seven. It should be noted that in FIG. 2A, no inter-base station communication is necessary due to the fact that one base station serves a plurality of sectors. In FIG. 2B, however, such a communication for communicating channel information for the users and the sectors and transmit/receive parameters calculated may be used where it is advantageous that this communication is performed as a wired communication network arranged between the base stations and a central controller 25 which has connection lines to receive information for the users or the individual sectors and to forward transmit/receive parameters to base stations and users and, additionally, power allocation data to the individual base stations.

These communication channels can be integrated in the usual backbone communication channels which exist for the base stations in a typical cellular communication network.

Figure 3A:
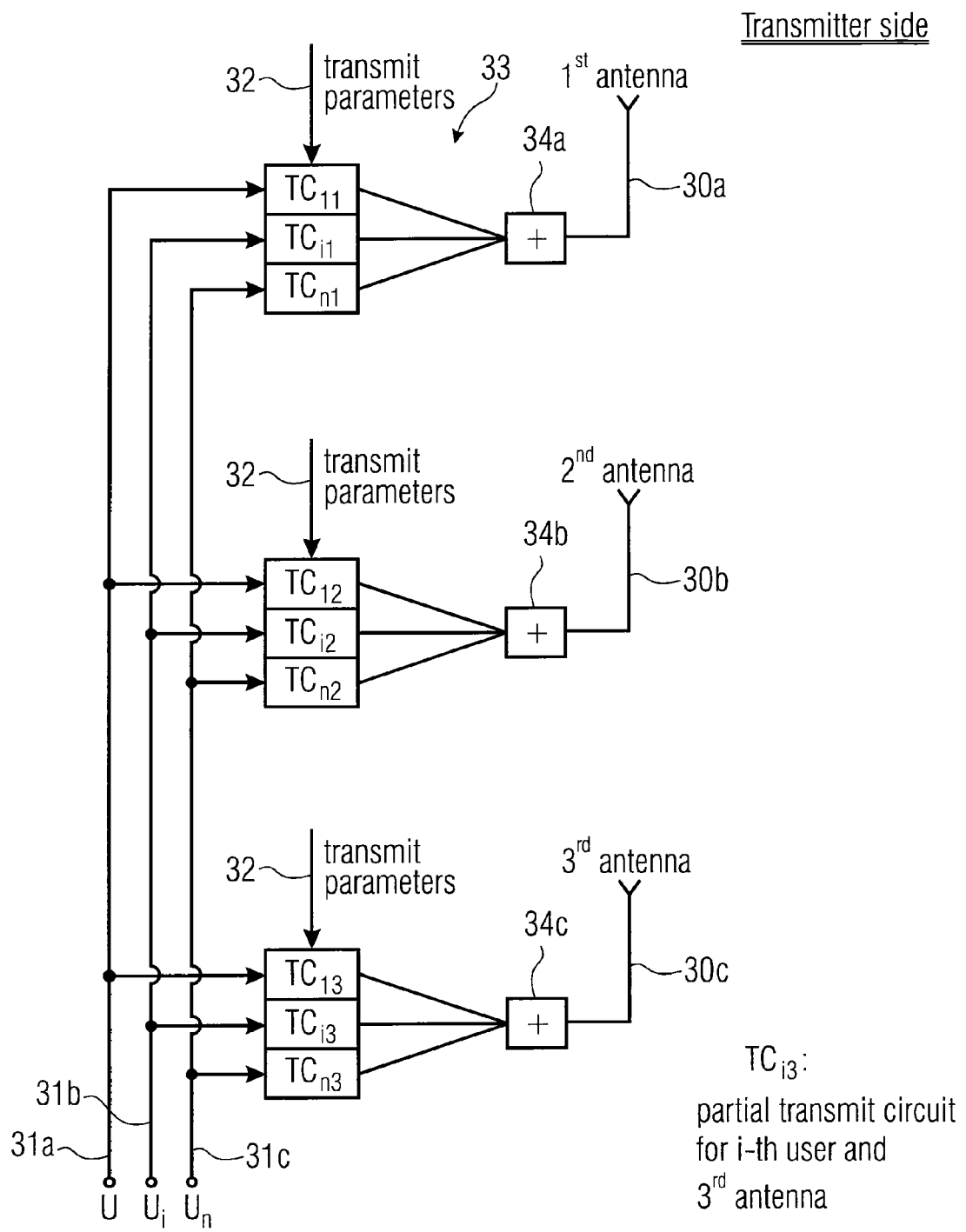
FIG. 3A illustrates the transmit circuit situation on the transmitter side, i.e. a transmit circuit for a transmission section in an exemplary situation of three users.

FIG. 3A illustrates a transmitter-side antenna array for a single transmission section where, for this single transmission section, three exemplary transmission antennas 30a, 30b, 30c are illustrated. The user data streams for individual users $U_1$, $U_i$ and $U_n$ positioned in the sector to which the antenna array in FIG. 3A is associated are illustrated at 31a, 31b, 31c. Individual data streams are input into transmit circuits where a transmit circuit for the first user $U_1$ is subdivided into three partial transmit circuits $TC_{11}$, $TC_{12}$ and $TC_{13}$. Additionally, each other user data stream 31b, 31c may have an individual transmit circuit where each transmit circuit is again subdivided into partial transmit circuits. For the user $U_1$; three partial transmit circuits $TC_{i1}$, $TC_{i2}$ and $TC_{i3}$ are illustrated. For the third user $U_n$, the transmit circuit consists of a partial transmit circuit $TC_{n1}$, $TC_{n2}$ or $TC_{n3}$. Each individual transmit circuit may comprise a gain/delay stage or may comprise a larger transmit filter, such as an FIR or IIR filter having more than one tap. Generally, the transmit circuits are controllable by transmit parameters, which are illustrated at 32, which are useful for controlling the transmit circuits illustrated in FIG. 3A, that are collectively denoted by a reference number 33. The output from the partial transmit circuit are respectively combined by combiners 34a, 34b or 34c. At the output of the combiner stages, which may include additional circuits apart from adder circuits such as high-frequency front-end circuits, etc., the antenna signals actually transmitted by the different antennas are output.

Figure 3B:
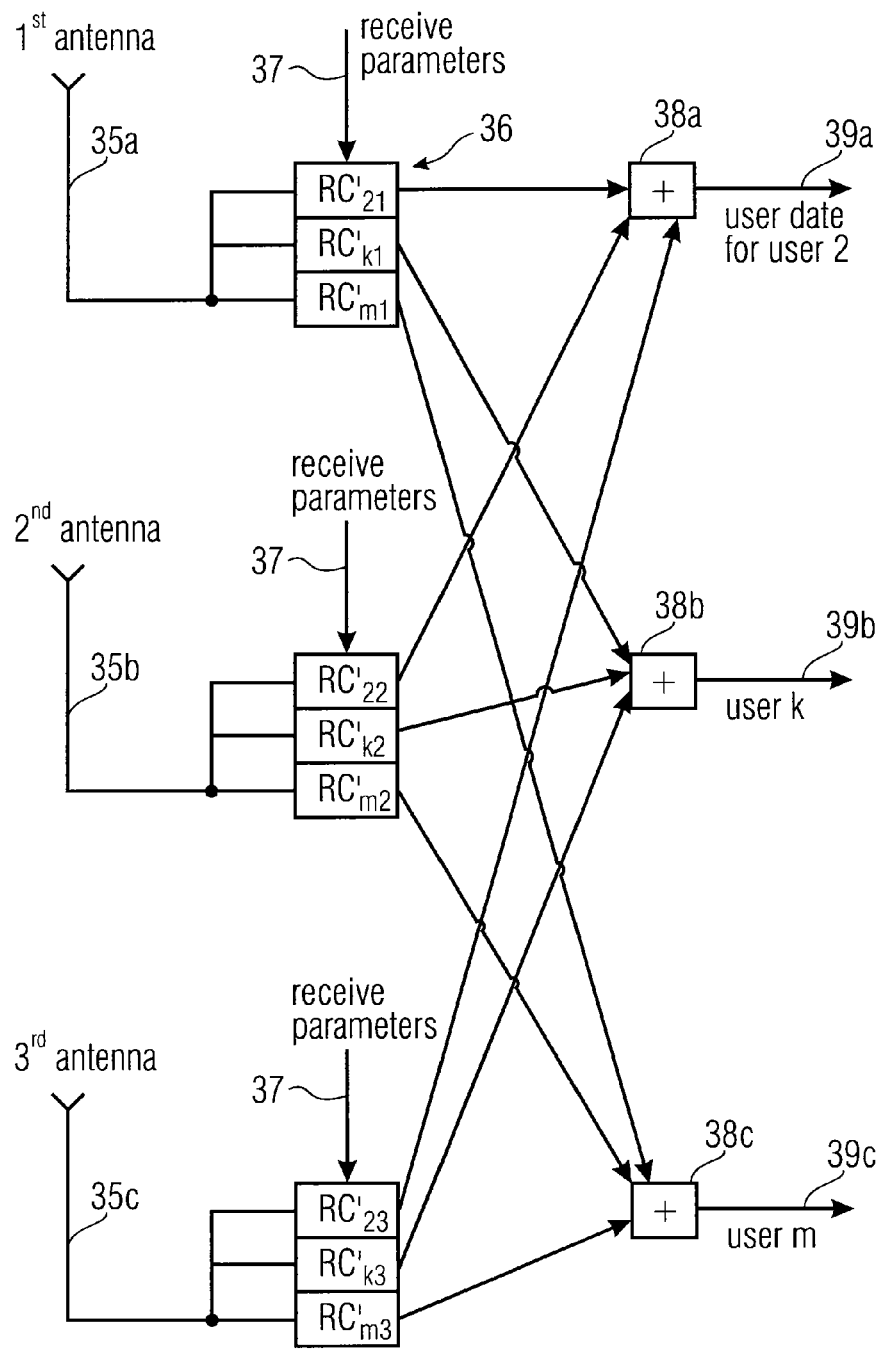
FIG. 3B illustrates a receive circuit being adjustable by receive parameters for a user device where the user device can receive the streams of several users.

FIG. 3B illustrates a corresponding receive circuit arranged together with a receive antenna array comprising a first receive antenna 35a, a second receive antenna 35b and a third receive antenna 35c. The antenna signals are respectively introduced into individual partial receive circuits. For the case, where there is only a single user in the receiver device or, alternatively, the receiver device only receives a single data stream, the receive circuit would only comprise the partial receive circuit $RC_{21}$, $RC_{22}$ and $RC_{23}$. Then, only the single combiner 38a might exist, and only the user data for user 2 illustrated at 39a would be output. However, a user device can be implemented for several individual users or when there is only a single user, three data streams which are all intended for the individual user might be transmitted as well. To this end, additional partial circuits $RC_{k1}$, $RC_{k2}$ and $RC_{k3}$ for the second user k illustrated at 39b or partial receive circuits $RC_{m1}$, $RC_{m2}$ or $RC_{m3}$ for an additional user m illustrated at 39c can be provided. In this case, additional combiners 38b, 38c may be used. It is to be emphasized that any high frequency/low frequency conversion circuits or analog/digital converters or so are not illustrated in FIG. 3B.

The partial transmit circuits collectively illustrated at 36 are controllable by receive parameters collectively indicated at 37 and the receive filters are controllable advantageously by complex receive parameters which can be in a magnitude/phase representation or a real part/imaginary part representation. Basically, the receive circuits will be implemented to perform a gain/delay modification, and therefore, complex parameters are advantageous. Depending on the certain implementation, the receive filters may comprise single gain/delay stages or higher order FIR or IIR filters having more than one filter tap.

In an embodiment, the calculator 10 in FIG. 1 is implemented to perform a successive processing so that the receive parameter for the first user and the allocation of the data stream to the first user so that the first user among the individual users is identified is calculated before, and subsequently, the receive parameter for the second user is calculated using the receive parameter for the first user.

Additionally, the allocation of the data stream and at the same time the identification of the second user among the users in the group of sectors is calculated in a successive way.

The calculator 10 is configured for calculating according to an embodiment, a projector matrix depending on a channel information between the first user and the transmission section of the second user and/or using the receive parameters for the first user. Particularly, the projector matrix which has been calculated in response to the allocation of the first user is used together with the channel information between each user and its associated individual transmission section for calculating the receive parameter for the second user.

Subsequently, an advantageous implementation of the inventive algorithm is described in more mathematical detail.

A cellular system is constituted by several sites, where a site is the area served by one base station, directed antennas are used to form sectors. We do not handle sectors of different sites other than sectors of the same sites and simply refer to a set of sectors. Whenever we refer to cooperation schemes, we usually use the well-established term base station cooperation, although sector cooperation (of all sectors) would be more precise.

The cellular system is given by a set of sectors S, $S=|S|$, and a set of users K, $K=|K|$ distributed throughout the covered area. User assignment to a sector is done by a sector selection scheme formally described by a mapping $f: K \to S$. We usually assume the assignment to a sector to be fixed for each user and therefore f partitions the users such that $$\mathcal{K} = \mathcal{K}_1 \cup \mathcal{K}_2 \cup \ldots \cup \mathcal{K}_S \text{ and } \mathcal{K}_i \cap \mathcal{K}_j = \emptyset \text{ if } i \neq j.$$

$M_{TX,s}$ is the number of transmit antennas of a sector s and $M_{RX,k}$ is the number of receive antennas of user k. Although not a prerequisite for the invention presented, we assume the same number of antennas for each sector and each user and therefore $$M_{TX,s} = M_{TX}, \forall s \in S,$$

and $$M_{RX,k} = M_{RX}, \forall k \in \mathcal{K}.$$

The set of orthogonal carriers in the OFDM system is denoted by C, $C=|C|$. The block diagonal channel matrices are $$\{H_{ks}\}^{k \in \mathcal{K}, s \in S} \in \mathbb{C}^{CM_{RX} \times CM_{TX}},$$

and $H_{ks}{}^c \in \mathbb{C}^{M_{RX} \times M_{TX}}$ is the channel matrix between sector s and user k on carrier c. The received signal of user k consists of the desired signal, intra-sector, and inter-sector interference and can be expressed as $$y_k = H_{kf(k)} x_k + \underbrace{\sum_{i \in \mathcal{K}_{f(k)} \setminus k} H_{kf(k)} x_i}_{\text{intra-sector interference}} + \underbrace{\sum_{i \in \mathcal{K} \setminus \mathcal{K}_{f(k)}} H_{kf(i)} x_i}_{\text{inter-sector interference}} + \eta,$$

where $x_i \in \mathbb{C}^{CM_{TX}}$ is the transmit signal for user i and $\eta \sim CN(0, \sigma^2 I_{CM_{RX}})$ represents white Gaussian noise, where $I_{CM_{RX}}$ denotes the $CM_{RX} \times CM_{RX}$ identity matrix and $\sigma^2$ is the power of the noise received by every antenna on every carrier. Assuming Gaussian modulation, the covariance matrix of the transmit symbol $x_i$ is $E\{x_i x_i^H\} = Q_i$. As we assume linear precoding, the covariance matrix of the noise plus interference for user k is given by $$Z_k = \sigma^2 I_{CM_{RX}} + \sum_{i \in \mathcal{K} \setminus k} H_{kf(i)} Q_i H_{kf(i)}^H,$$

and the information theoretic rate for user k is given by $$R_k = \log_2 \left( \frac{|H_{kf(k)} Q_k H_{kf(k)}^H + Z_k|}{|Z_k|} \right).$$

Using the invention presented, communication in the network is carried out by transmitting data streams over scalar channels that are established by linear transmit and receive filters. An operation point of the network is therefore defined by the set of data streams D, $D=|D|$, $$\mathcal{D} = \{(\pi(1), u_1, v_1, p_1), \ldots, (\pi(D), u_D, v_D, p_D)\},$$

where each stream d is described by the assignment to a user $\pi(d) \in K$, receive filter $u_d \in \mathbb{C}^{CM_{RX}}$, transmit filter $v_d \in \mathbb{C}^{CM_{TX}}$, and power allocation $p_d \in R_+$. The receive and transmit filters are chosen as normalized vectors and the rate of a data stream d can be calculated as $$R_d = \log_2 \left( 1 + \frac{|u_d^H H_{\pi(d), f(\pi(d))} v_d|^2 p_d}{\sigma^2 + \sum_{i \in \mathcal{D} \setminus d} |u_i^H H_{\pi(d), f(\pi(i))} v_i|^2 p_i} \right) \quad (1.1)$$

Embodiments of the invention relate to a scheme that selects the stream set D, aiming at the maximization of a utility $U: D \to R_+$ that measures the network performance, in our case the total sum-rate in the network $$U(\mathcal{D}) = \sum_{d \in \mathcal{D}} R_d.$$

As the scheme intends to completely avoid interference, the filters are selected under a zero forcing constraint, meaning that $$u_i^H H_{\pi(d), f(\pi(i))} v_i = 0 \, \forall i \in \mathcal{D} \setminus d,$$

for all $d \in D$. We define the gain of the scalar channel for each stream as $$\lambda_d = \frac{1}{\sigma^2} |u_d^H H_{d, f(\pi(d))} v_d|^2. \quad (1.2)$$

The rate of a stream is then given by $$R_d = \log_2(1 + \lambda_d p_d).$$

Assuming that the transmit and receive filter for all data streams are fixed, the optimal power allocation is calculated per sector according to the waterfilling rule. For a sector s the power allocation is given by $$p_d = \max\{\mu_s - \lambda_d^{-1}, 0\}, \forall d \in \mathcal{D}_s,$$

where $$\mathcal{D}_s = \{d \in \mathcal{D} : f(\pi(d)) = s\} \quad (1.3)$$

is the set of streams transmitted by sector s and $\mu_s$ is chosen such that the complete power budget $P_s$ of the sector s is used, i.e.

$$\sum_{d \in \mathcal{D}_s} p_d = P_s.$$

To facilitate more convenient notation we define a function WF(D), that updates the power allocation according to the waterfilling rule, $$\mathcal{D} \leftarrow WF(\mathcal{D}). \qquad (1.4)$$

It remains to describe how to decide for the set of data streams. The presented invention is a scheme to successively allocate the data streams, aiming at the maximization of sum-rate, while the transmit and receive filters are chosen to eliminate interference.

The data stream allocation successively selects the stream $d_m$ that promises the maximum increase in sum-rate. The stream is selected by deciding for the user, the transmit filter, and the receive filter. The first stream selected is found by solving $$\{\pi(1), u_1, v_1\} = \underset{k \in \mathcal{K}, u, v}{\mathrm{argmax}}\; u^H H_{kf(k)} v$$

$$\text{s.t.}\; \|u\|_2, \|v\|_2 = 1.$$

The solution is the user who's channel has the maximum principal singular value, and $u_1$ and $v_1$ are chosen as the corresponding left and right singular vectors. Besides finding the user to allocate the data stream, the corresponding receive filter is determined as well, which is kept fixed. When continuing to allocate streams, projector matrices $P_1, \ldots, P_S$ per sector are used to assure orthogonality to the previously assigned streams. The projector matrices are initialized by identity matrices and updated after each step of the stream allocation. Assuming the m-th stream is allocated to user k and the receive filter is $u_m$, the projection matrices are updated as follows:

$$P_s^{(m+1)} = P_s^{(m)} - \frac{P_s^{(m)H} H_{ks}^H u_m u_m^H H_{ks} P_s^{(m)}}{u_m^H H_{ks} P_s^{(m)} H_{ks}^H u_m} \; \forall\, s \in \mathcal{S}.$$

Selection of the m-th stream is done such that stream $d_m$ does not disturb the previously allocated data streams, which is assured by the projection matrices $P_1^{(m)}, \ldots, P_s^{(m)}$:

$$\{\pi(m), u_m, v_m\} = \underset{k \in \mathcal{K}, u, v}{\mathrm{argmax}}\; u^H H_{kf(k)} P_{f(k)}^{(m)} v \qquad (1.5)$$

$$\text{s.t.}\; \|u\|_2, \|v\|_2 = 1.$$

At this point of the stream allocation the power allocation is meaningless so we can set $p_m=0$ and update the set of streams as follows:

$$\mathcal{D}'^{(m)} = \mathcal{D}'^{(m-i)} \cup (\pi(m), u_m, v_m, 0).$$

Assume $D'^{(m)}$ as result of stream allocation, it is clear that a stream $d_n$ does not cause interference to the streams $d_1, \ldots, d_{n-1}$, due to the way it was selected. However, it well interferes with the streams $d_{n+1}, \ldots, d_m$ and therefore the transmit filters, $v_n$, $n \in \{1, \ldots, m-1\}$, are updated according to a zero forcing constraint $$v_n = \underset{v}{\mathrm{argmax}}\; u_n^H H_{\pi(n), f(\pi(n))} v \qquad (1.6)$$

$$\text{s.t.}\; u_e^H H_{\pi(e), f(\pi(n))} v = 0 \; \forall\, e \in \mathcal{D}'^{(m)} \setminus d_n,$$

$$\|v\|_2 = 1.$$

Thus the MIMO system is decomposed into a system of effective interference free scalar subchannels where the gains are given Equation (1.2). Now we can calculate the optimal power allocation and update the stream set $$\mathcal{D}^{(m)} = WF(\mathcal{D}'^{(m)}).$$

It is known from the single cell LISA algorithm that with each newly allocated user the number of zero-forcing constraints in Equation (1.6) increases and all channel gains diminish from one step to the next. It can therefore happen that the losses in channel gain for the streams already allocated leads to a stronger decrease in sum-rate than the gain through the newly allocated stream. For this reason we check in each iteration, whether the addition of another stream still leads to an increase in sum-rate, i.e.

$$U(\mathcal{D}^{(m)}) > U(\mathcal{D}^{(m-1)})$$

If not the algorithm terminates and $D^{(m-1)}$ is the operating point of the network chosen by our algorithm. The algorithm terminates anyway, when $m = CM_{tx}$ as for $m > CM_{tx}$ is no solution to (1.6).

Figure 4A:
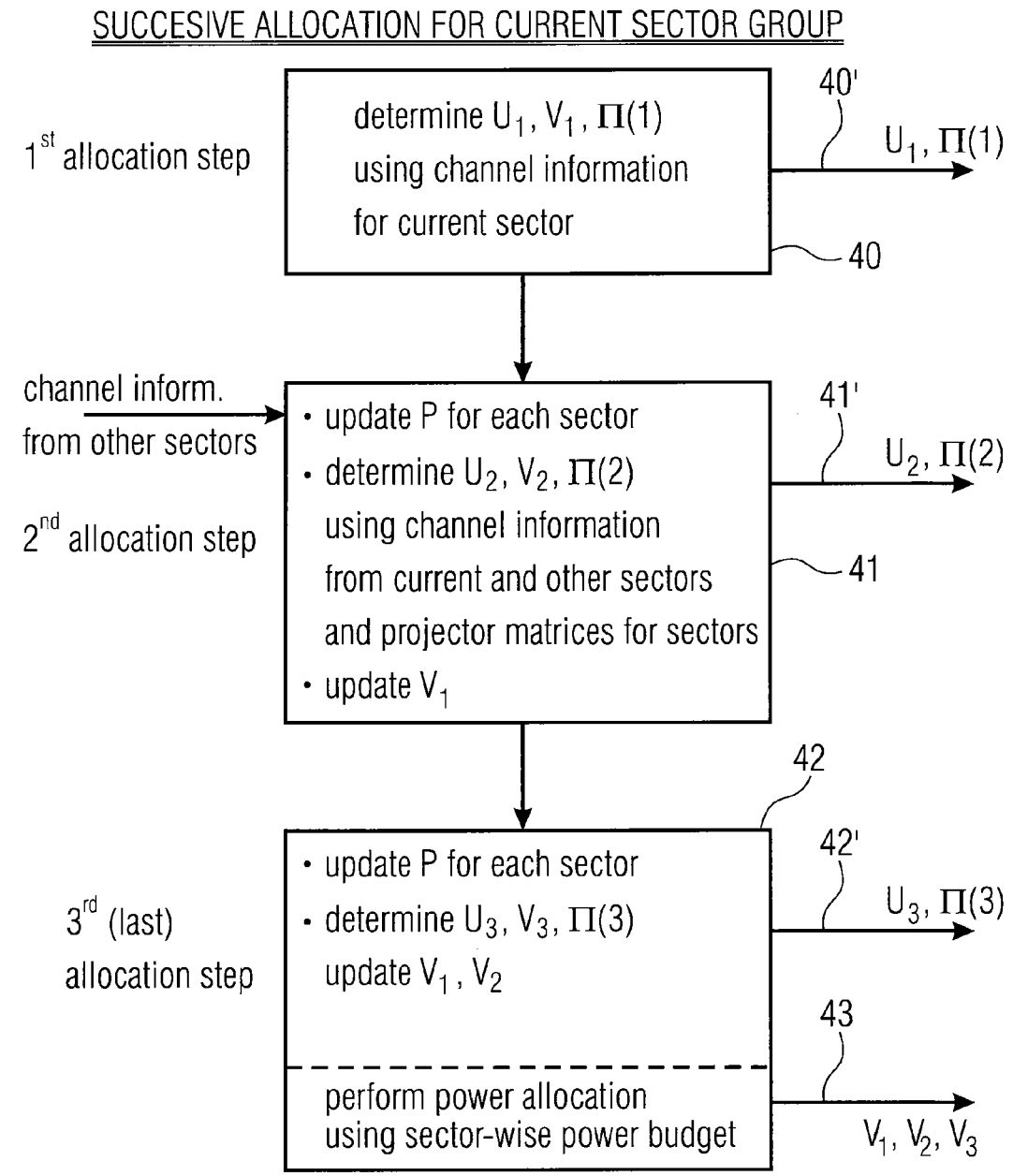
FIG. 4A illustrates a diagram illustrating the successive allocation for a current sector group.

FIG. 5 gives a mathematical overview of this algorithm which will now subsequently be discussed in the context of FIG. 4A. FIG. 4A illustrates the successive allocation, or stated generally, the successive calculation of receive parameters and finally, transmit parameters for an MIMO system. In a first allocation step 40, which is the very first application of equation 50 in FIG. 5, the receive parameters $u_1$, the transmit parameters $v_1$ and the allocation, i.e. which user or which user stream is used in the first allocation step is determined. Since this is the very first user, only the channel information for the current sector, where this user is located is applied. This is clear from FIG. 5 due to the fact that the initialization of the projector matrix P is the unity matrix I.

The allocation $\pi(1)$ and the receive parameter u1 are output at 40'. Then, in the next allocation step, an updated projector is calculated in accordance with equation 52 in FIG. 5. Importantly, this projector is calculated for each sector in the group of sectors. When the group of sector covers the whole network, then for each sector in the network an updated projector matrix P is calculated. When however, only three sectors attached to a single base station are to be considered, then only three projector matrices P are to be calculated. In a medium-sized cluster where seven base stations and 21 sectors are considered, 21 projector matrices P are calculated. Then, subsequent to the calculation of the updated projector matrices, equation 50 in FIG. 5 is again used for finding the next user and it becomes clear that for each user the channel information between this user and the transmission sector associated with this user is used, and importantly, additionally the influence of a preceding allocation which has taken place in a different sector. Based on equation 50, a determination of the second user $\pi(2)$ and a determination of the receive parameter $u_2$ for the second user is performed and output at 41'. Furthermore, an update operation as illustrated in equation 52 of the transmit parameter calculated earlier for the first user in step 40 is performed. The two conditions given in equation 51 of FIG. 5 are that the transmission rate is maximum (first line of equation set 51 in FIG. 5) and (subject to—s.t.) that other data streams are not disturbed. When the second allocation was the last allocation in the cycle, then $v_1$ updated in step 41 and $v_2$ calculated in step 41 are output and the whole procedure is completed. When, however, a third allocation, i.e. a third user in the group of sectors exist, then step 42 is performed. In step 42, again a new projector matrix is calculated for each sector in the cluster (group of sectors) as illustrated in equation 52. Then, in accordance with equation 50, an allocation t(3) for the third user and the calculation of the receive parameter $u_3$ for the third user is calculated and output as illustrated at 42'. Additionally, an update of preceding calculated transmit parameters $v_1$, $v_2$ is performed. It is assumed that the third allocation step was the last allocation step, now the three transmit parameters $v_1$, $v_2$ generated by the update step and the third transmit parameter $v_3$ generated in the actual allocation step are output as illustrated at 43. Then, subsequent to the successive allocation and successive calculation of receive/transmit parameters, the power allocation is performed advantageously using a sector-wise power budget as discussed in the context of equation (1.3). The advantageous algorithm for the power allocation is the water-filling rule, but other power allocation algorithms can be applied as well, when the allocation and the transmit/receive parameter are fully calculated for all users not within a single sector but within the group of sectors which are jointly processed in accordance with embodiments of the present invention.

As illustrated, the channel information from sectors are used for the updating of $v_i$. Furthermore, it is advantageous to determined the user allocation by performing a singular value decomposition of the full MIMO channel matrix between a user and the transmitter antenna array. This singular value decomposition is performed for all users individually and the user resulting in the largest singular value is advantageously selected. Then the transmit parameter is calculated as the left singular vector, and the receive parameter vector is calculated as the right singular vector, and at least one complex value for each partial receive circuit or transmit circuit illustrated in FIG. 3A, FIG. 3B is found.

When, however, an allocation has already been performed, then the singular value decomposition is not performed with the channel matrix itself, but is performed with the product between the projector matrix for this sector and the individual user channel matrix. Hence, for determining a second or a further allocation as illustrated in step 41 or step 42, the projector matrix for each sector is to be multiplied to the channel matrix of a user in the sector, and after this multiplication with the projection matrix, which exists for each sector, the same procedure as in the first step 40 is performed.

Other algorithms for finding a solution to the problem indicated at step 50 in FIG. 5 can be applied as well as long as an influence of an earlier allocation in a different sector is taken into account.

Figure 4B:
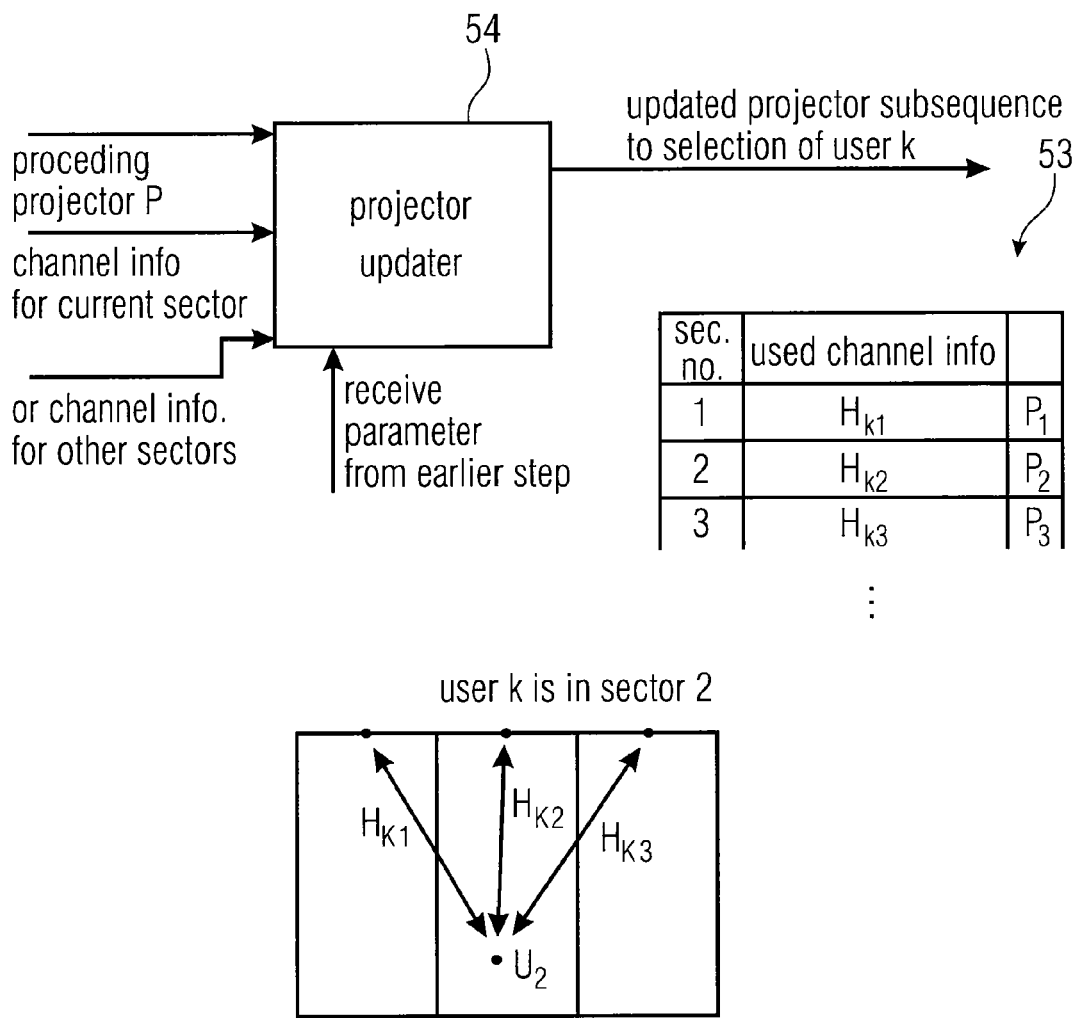
FIG. 4B illustrates a detailed implementation of the projector updater calculating updated projector matrices for all sectors in the sector group.

FIG. 4B illustrates the projector matrix handling indicated in step 52 in more detail. To this end, a projector updater 54 is applied, which receives a preceding projector $P^{(m)}$, and additionally receives the channel information for the current sector or the channel information for other sectors depending on the sector for which the projector matrix is calculated. Additionally, the receive parameters $u_m$ from the earlier step are used as an input. The output is an updated projector which is calculated in accordance with equation 52 of FIG. 5 subsequent to the selection of a user k. Hence, for each sector having a sector number, a projector $P_i$ is calculated as illustrated by table 53. When the situation in FIG. 4B is considered where three sectors $S_1$, $S_2$, $S_3$ are illustrated, it becomes clear that the projector which is calculated subsequent to the allocation of user U2 for sector $S_2$ is based on the current sector channel information, but projectors $P_1$, $P_3$ for the first sector $S_1$ and for the third sector $S_3$ are based on cross-sector channel information which are responsible for interference management for reducing influences of an earlier allocation in a different sector. Hence, for an allocation of a third user assumed in sector 1, channel information between user $U_2$ and sector S1 ($H_{21}$), and between user $U_2$ and sector $S_2$ and user U2 and sector S3 (H23) would be accounted for, in case there would be competing users in sectors S2 or S3.

In an embodiment, the calculator 10 is configured to select the user from the first, the second and the third user so that this user has a higher data rate with its associated transmitter section than the other two users with their associated transmitter sections. Furthermore, for each transmitter section an influence of the selection of this user on the transmitter section is calculated where this influence may, for example, be the projector matrix. Then, a successive selection of the further user from the first, the second and the third user is performed so that the further user has a higher data rate with its associated transmitter section than an additional user, wherein the influence of the section is used together with the channel information between the user and its associated transmitter section. This is also illustrated in FIG. 4B at the inputs to the projector updater 54.

Furthermore, the calculator 10 or 52 may be configured to calculate the receive parameter for the one user based on the channel information between the one user and its associated transmitter section and to calculate the receive parameter for the further user based on the channel information between the further user and its associated transmitter section and based on the calculated influence of the earlier selection. Furthermore, the calculator 10 is configured to calculate the first transmission parameter for the first transmitter section associated with the first user and a second transmitter parameter for the transmitter section associated with the second user subsequent to a termination of a successive allocation, wherein the first transmitter parameter and the second transmitter parameter are calculated such that an interference of the other users by the transmission to the previously selected users is reduced or eliminated.

The intuition behind the successive stream allocation is to add the user promising to lead to the maximum increase in sum-rate, while being orthogonal to the previously allocated users. For the single cell case, this user $\pi(m)$ is found as the user with the maximum principal singular value of the channel $H_{\pi(m)f(\pi(m))}$ projected into the subspace given by range $(P_{f(\pi(m))}^{(m)})$. The direct transfer of this into the multi-cell case is Equation (1.5). However, it only matches the forth mentioned intuition in case power can be freely transferred in-between all streams as in the single cell case. For the multi-cell case one has to consider the per sector power constraint, in order to find the most promising stream. As an example to illustrate this, assume the following extreme case: The algorithm is applied to a scenario where one sector has users with extremely good channels while the users of the other sectors have extremely bad channels. Using the stream selection rule given by Equation (1.5) will assign all the streams to users of the "good" sector and leave the power budgets of the other sectors unused. Therefore we extend the user selection with an estimation of the allocated power to the stream, assuming that power is distributed uniformly between all streams sent by one sector. We therefore replace Equation (1.5) by the following stream selection criterion $$\{\pi(m), u_m, v_m\} = \underset{k \in \mathcal{K}, u, v}{\operatorname{argmax}} \frac{P_{f(k)}}{|\mathcal{D}_{f(k)}| + 1} |u^H H_{kf(k)} P_{f(k)}^{(m)} v|^2$$

$$\text{s.t. } \|u\|_2, \|v\|_2 = 1,$$

where $P_s$ is the power constraint of sector s and $D_s$ is defined in Equation (1.3).

When the above equation is compared to equation (1.5), it becomes clear that due to the additional vector in front of the squared absolute value term, a vector which already has received a user is provided with a "malus." for the next allocation round provided that its power budget indicated by the numerator of the pre-term is similar to the power budget for the other sectors. When, however, the power budget for a certain sector is much higher than the power budget for a neighboring sector, then the quotient between the power and the number of already allocated sectors can nevertheless be large enough so that, instead of the "malus", this sector has due to the high power budget nevertheless good conditions for the next allocation round.

For a system with multiple carriers, C>1, a more efficient implementation is advantageous. Knowing that the stream selection is based on the left and right singular vectors of the channel matrices, which are block diagonal, the data of a stream is transmitted on a single carrier. Additionally, the projector matrices are block diagonal and the update of the projectors only affects a single block. Therefore we are able to work on the subcarriers directly and have projection matrices per sector and carrier. There can not be more than $M_{TX}$ streams on one carrier, which is however automatically assured as the projector on this carrier becomes the all zero matrix when applying the update for the $M_{TX}$-th user on this carrier. To account for the per sector power budgets, we have to search over all carriers simultaneously, which only increases the complexity marginally. The channel gains can be calculated for all users on all subcarriers once and only for the carrier of the recently allocated stream the projection matrices and the corresponding gains are updated. Obviously, the power reallocation needs only be done for the sectors that actually transmits on this carrier.

The implementation for OFDM with multiple carriers is illustrated in mathematical form in FIG. 6 in an embodiment. Specifically, the algorithm in FIG. 6 has the modified projector calculation at equation 52*a*.

Furthermore, the power budget identification is indicated at multiplied equation 50*a*. The application to the different carriers is illustrated at equation 51*a* with respect to the transmit parameter update in each allocation step.

Subsequently, further modifications for increasing the number of data streams are illustrated.

Figure 2C:
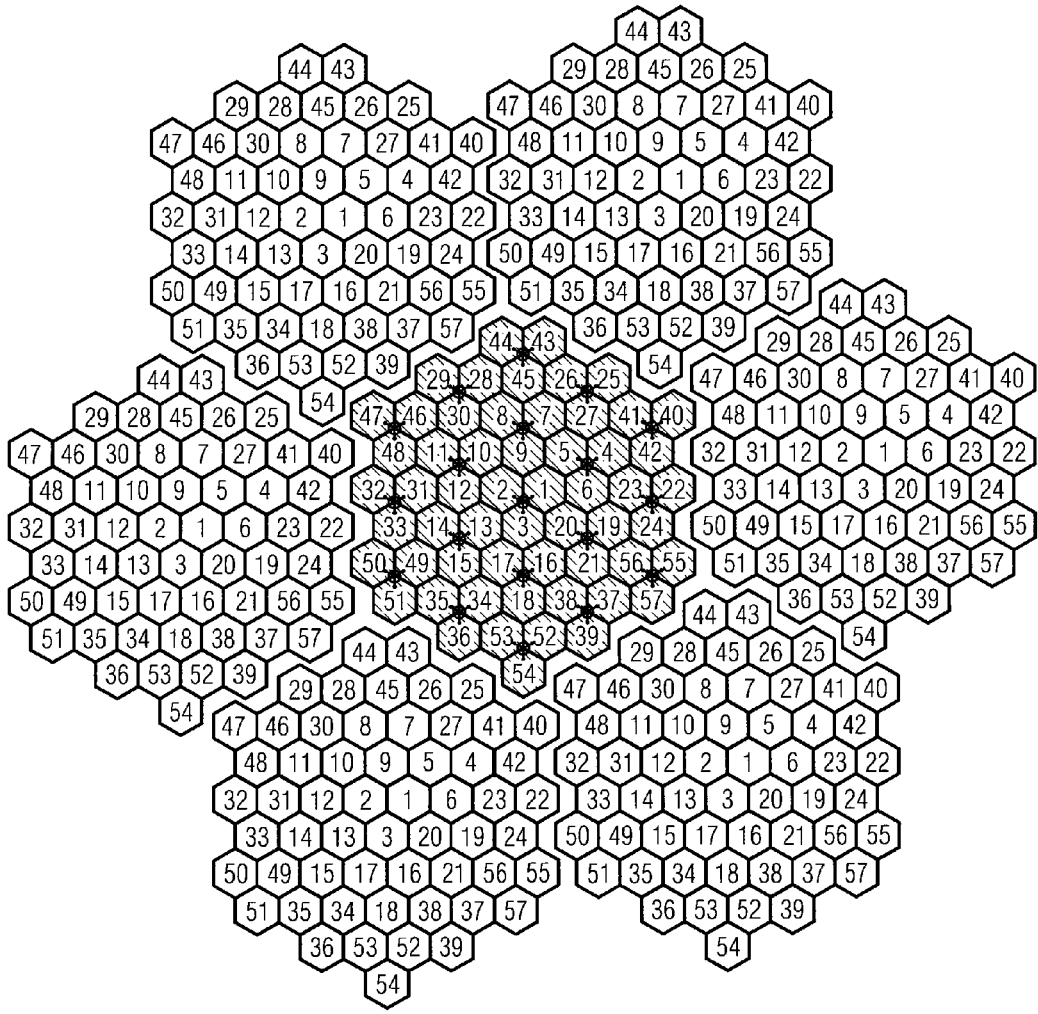
FIG. 2C is a diagram illustrating the situation of a cluster of base stations each serving three sectors using directional antenna arrays in a wrap around configuration.

Clustered base station cooperation is advantageous for geographical large cellular systems, as interference coming from base stations at a very far distance can simply be neglected. However, the system regarded here is by no means large enough for this argument to hold and due to the wrap around configuration, interference from all sites has significant influence. The motivation for clustered cooperation here comes from the fact that full orthogonalization proved ineffective and clustered cooperation is one way to introduce a non-orthogonal component. The local cooperation in a cluster is meant to remove some of the dominant interference and by that increasing the signal to interference ratio. Overall, such a clustered cooperation again is interference limited, with a saturation rate hopefully higher than for egoistic schemes. Here two types of clusters are considered, one is the cooperation of the three sectors of one site, for example sector 1, 2, and 3 in FIG. 2*c*, the other formed by the sectors of three sites opposite each other, for example sector 1, 6, and 20 in FIG. 2*c*. Multi-cell LISA is applied for each cluster and interference of other sectors is treated as noise.

Interference management strategies completely avoiding interference by zero-forcing suffer from the small number of users that can be served. Clustered interference management might not be flexible enough, which makes an integrated approach aware of the special situation of cell-center users desirable. One possibility is a multi-cell LISA algorithm with an interference threshold, which introduces a non-orthogonal component.

The amount of interference allowed in the network is controlled at two points. One is to weaken the zero-forcing constraints in Equation (1.6), for example based on the gains of the interfering channel. For each stream $d \in D^{(m)}$ a set of streams is defined.

$$\mathcal{E}_d^{(m)} = \{e \in \mathcal{D}^{(m)} \setminus d : \|u_e^H H_{\pi(e), f(\pi(d))}\|_2^2 > \alpha\}$$

where the gain of the cross-channels is above a certain threshold $\alpha$. The transmit filter $v_d$ is chosen under a zero-forcing constraint for the streams in $\epsilon_d^{(m)}$:

$$v_d = \underset{v}{\operatorname{argmax}} \ u_d^H H_{\pi(d), f(\pi(d))} v$$

$$\text{s.t. } u_e^H H_{\pi(e), f(\pi(d))} v = 0 \ \forall \ e \in \mathcal{E}_d^{(m)}$$

$$\|v\|_2 = 1,$$

This however does not increase the number of users served, as for the $M_{TX}$-th user allocated on a carrier c the Projectors $P_s^{c,(m)}$ are the all-zero matrices. Therefore a threshold is added when to consider a newly allocated user for the update of the projectors. This however might lead to cases that the optimization given by Equation (1.7) does not have a solution. Therefore it is made sure that users are included only, such that the remaining zero-forcing constraints can still be fulfilled, $$\epsilon_d \leq M_{TX} - 1 \ \forall d \in \mathcal{D},$$

as otherwise there is no solution to Equation (1.7).

It is to be noted that due to the block diagonal structure of the channels and the fixed receive filter being a left singular vector of the channel matrix, the dimension of the space one can find meaningful solutions to Equation (1.7) is $M_{TX}$ and not $CM_{TX}$! The control how much streams are allocated is done by modifying how the projectors are allocated. Assuming a stream with receive filter $u_m^H$ has been assigned on carrier ĉ, the new rule for the projector update of sector s is $$P_s^{(m+1)} = \begin{cases} P_s^{\hat{c},(m)} - \dfrac{P_s^{\hat{c},(m)} H_{ks}^{\hat{c}H} u_m u_m^H H_{ks}^{\hat{c}} P_s^{\hat{c},(m)}}{u_m^H H_{ks}^{\hat{c}} P_s^{\hat{c},(m)} H_{ks}^{\hat{c}H} u_m} & \text{if } \|u_m^H H_{ks}^{\hat{c}}\|_2^2 \geq \alpha \\ P_s^{\hat{c},(m)} & \text{if } \|u_m^H H_{ks}^{\hat{c}}\|_2^2 < \alpha \\ 0 & \text{if } \exists\, d \in \mathcal{D}^{\hat{c},(m)}, \text{ where } |\mathcal{E}_d| = M_{TX} - 1 \end{cases}$$

The modified algorithm is summarized in FIG. 7.

FIG. 7 illustrates the new projector update matrix at equation 52b in view of non-perfect orthogonality, i.e. when a certain amount of interference, i.e. the interference threshold his allowed.

FIG. 8 shows the simulation results for the clustered versions of multi-cell LISA. At high SNR the per site clustered cooperation has a significant gain compared to the egoistic scheme, the clusters formed by opposite sectors are non-competitive. For the high SNR region, the gain is roughly 25%. Surprisingly the most gain comes from eliminating the interference that is already suppressed by the antenna pattern. The main reason are the users very close to the site, where the interference of the sectors at the same site is by far the most dominating, and removing it leads to high gains. FIG. 8 also shows the simulation results for the version with threshold, for various choices of α. Clearly, the larger the interference threshold the higher the number of data streams as more interference is tolerated. Choosing a good a obviously depends on the scenario investigated, here a value between −60 dB and −70 dB seams to be a good choice, the gain compared to the egoistic scheme is roughly 38% even the per site cooperation is outperformed. The drawback of the threshold version is the increased complexity compared to the per site cooperation, as all data streams in the network are allocated sequentially, while they are compute parallel for each site in the clustered version.

Up to now it was assumed that the sector assignment is given. There is however a direct way to include sector assignment into the Multi-Cell LISA algorithm. f(k)=0 ∀k∈K is initialized and a successive update of f(k) by f̂(k) is done by solving $$\{\pi(m), u_m, v_m, \hat{f}(k)\} = \underset{k \in \mathcal{K}, u, v, \hat{f}(k)}{\operatorname{argmax}} \quad u^H H_{k,\hat{f}(k)} P_{\hat{f}(k)}^{(m)} v$$

$$\text{s.t.} \quad \|u\|_2, \|v\|_2 = 1,$$

$$\hat{f}(k) \in S \forall\, k \in \{k: f(k) = 0\},$$

$$\hat{f}(k) = f(k) \forall\, k \in \{k: f(k) \neq 0\}.$$

Including the sector assignment into the data stream selection increases complexity, therefore one might limit the set of sectors each user might possibly be assigned to. A practical criterion here would be to consider only the channels a user is able to measure. Since the per base station power constraint was considered, this automatically provides a form of load balancing among the sectors.

As discussed, the receive parameter calculator 10 is configured for using an information on a number of users already having calculated receive parameters in a respective individual transmission section so that users associated with an individual transmission section which already has less associated users than a different individual transmission section are advantageous in the user selection. One way to accomplish this is the application of equation 50a illustrated in FIG. 6 or FIG. 7, where this implementation, of course, can also be applied for a non-carrier wise allocation illustrated in FIG. 1. It is additionally advantageous to account for the power budget in a sector so that the "malus" introduced by the logic behind equation 50a can be balanced by the introduction of the power budget for the sector which is done, for example, by the numerator of the pre-factor of equation 50a in FIG. 6 or FIG. 7.

Additionally, the calculator 10 is configured for additionally calculating a transmit parameter subsequent to a calculation of the receive parameter for the second user, and advantageously, by finally calculating final transmit parameters in the end, when the successive allocation has been terminated where the calculation of the receive parameters for the users is done so that an interference at a third user caused by a transmission of a data stream for the second user is reduced or eliminated.

Advantageously, as illustrated by equation 52b in the embodiment, the transmit parameter calculation is performed so that an interference below a pre-determined interference threshold is allowed, wherein the interference threshold is based on a gain of an interfering channel. An advantageous interference threshold is in the range between 80 dB and 50 dB.

Advantageously, the calculator 10 in FIG. 1 is configured for only performing a projector matrix update if a threshold determined by a newly allocated data stream for a user is exceeded and for not performing a projector update when the threshold is not exceeded. In the case of a determination that the projector update is not necessary, the projector matrix stored in, for example, the table 53 in FIG. 4b is used for the next allocation round as if it would be a new projected matrix. Hence, the computational resources for calculating new projector matrices which only deviate slightly from earlier projector matrices can by saved.

Furthermore, the inventive apparatus comprises a transmission section assigner for assigning a user of the plurality of users to a certain individual transmission section, the transmission section assigner being configured for communicating an assignment for a user to the individual transmission section to which the user is associated. The transmission section assignor 16 is connected to the receive parameter calculator 10 via a connection interface and is additionally connected to the communication interface 17, so that the section assignment information is forwarded to the communication interface 17. The communication interface 17 can transmit this information to the corresponding transmit section associated with a base station.

In an embodiment, the transmission section assignor 16 is configured for calculating the sector assignment as discussed in accordance with the above equation. This assignment will be particularly useful for users positioned at sector edges, since there might be the case that, instead of the sector assignment geographical sector borders, an association of a certain user to a different sector than determined by the geographical position is useful for quality and data rate.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for calculating receive parameters for an MIMO system comprising a plurality of individual transmission sections, a transmission section comprising a transmit circuit being adjustable by a transmit parameter, and a plurality of individual users, a user comprising a receive circuit being adjustable by a receive parameter, comprising:

a calculator comprising hardware for calculating a receive parameter for a first selected data stream for a first user of the plurality of users using a channel information for a transmission channel between the user and a first individual transmission section, to which the user is associated, and for calculating a receive parameter for a second selected data stream for a second user of the plurality of users associated with a second individual transmission section, the second individual transmission section being different from the first individual transmission section, using a channel information between the first user and the second individual transmission section, to which the second user is associated with, wherein an interference caused by a transmission of an individual transmission section at a user in a different transmission section is reduced or eliminated, wherein the calculator is configured for calculating a projector matrix depending on a channel information between the first user and the second individual transmission section, or the receive parameter for the first user, and for using the projector matrix together with the channel information between each user and its associated individual transmission section, for calculating the receive parameter for the second user, and wherein the calculator is configured for calculating the projector matrix based on the following equation:

$$P_s^{(m+1)} = P_s^{(m)} - \frac{P_s^{(m)} H_{ks}^H u_m u_m^H H_{ks} P_s^{(m)}}{u_m^H H_{ks} P_s^{(m)} H_{ks}^H u_m} \forall s \in S.$$

wherein s indicates an individual transmission section from the plurality of individual transmission sections S, $P^{(m+1)}$ is an updated projector matrix for step m+1, $P^{(m)}$ is a projector matrix of an earlier updating step m, $H_{ks}$ is a channel matrix between a user k and an individual transmission section s, to which the user is not associated with, $u_m$ is a vector comprising a receive parameter or more receive parameters calculated for one or more preceding steps, and $^H$ indicates a conjugate complex transpose operation.

2. The apparatus in accordance with claim 1, in which the calculator is configured for performing a successive processing, so that the receive parameter for the first user is calculated and, subsequently, the receive parameter for the second user is calculated using the receive parameter for the first user.

3. The apparatus in accordance with claim 1,
wherein the calculator is configured for calculating a characteristic value for each user based on the channel information for the channel between the user and its associated individual transmission section, and based on the projector matrix for the individual transmission section, and for selecting the user, who comprises a characteristic value satisfying a predetermined criterion.

4. The apparatus in accordance with claim 1, wherein the calculator is configured for using an information on a number of users already having calculated receive parameters in a respective individual transmission section, so that users associated with an individual transmission section, which already comprises less associated users than a different individual transmission section are advantageous in a user selection.

5. The apparatus in accordance with claim 1, in which the calculator is configured for additionally calculating a transmit parameter subsequent to a calculation of the receive parameter for the second user so that an interference at a third user caused by a transmission of a data stream for the second user is reduced or eliminated.

6. The apparatus in accordance with claim 1, in which a calculation of a transmit parameter for the second user is performed so that an interference below an interference threshold is allowed, wherein the interference threshold is based on a gain of an interfering channel.

7. The apparatus in accordance with claim 1, in which the calculator is configured for only performing a projector matrix update, when a threshold determined by a newly allocated data stream for a user is exceeded, and for not performing a projector matrix update, when the threshold is not exceeded.

8. The apparatus in accordance with claim 1, in which an individual transmission section is a sector defined by a sector antenna array connected to a base station in a cellular network.

9. The apparatus in accordance with claim 8, in which the base station comprises a plurality of attached individual transmission section antenna arrays.

10. The apparatus in accordance with claim 1, further comprising a transmission section assignor for assigning a user of the plurality of users to a certain individual transmission section, the section assignor being configured for communicating an assignment for a user to the individual transmission section to which the user is associated.

11. The apparatus in accordance with claim 1, further comprising a communication interface for communicating the receive parameters for the first and the second users to the first and the second user circuits and for transmitting corresponding transmit parameters to the corresponding transmit circuits or for receiving a channel information between each of the plurality of users and each individual transmission section irrespective of the fact whether the corresponding user is associated to the individual transmission section or not.

12. The apparatus in accordance with claim 1, in which the calculator is configured to select a user from the first user, the second user and the third user, so that this user comprises a higher data rate with its associated transmission section than the other two users with their associated transmission sections, to calculate, for each transmission section, an influence of the selection of the user on the transmission section,
to successively select a further user from the first, the second or the third users so that the further user comprises a higher data rate with its associated transmission section than another user, wherein the influence of the selection is used together with the channel information between the user and its associated transmission section.

13. The apparatus in accordance with claim 1, in which the calculator is configured to calculate the receive parameter for the one user based on the channel information between the one user and its associated transmission section,
to calculate the receive parameter for the second user based on the channel information between the second user and its associated transmission section and the calculated influence of a preceding selection,
to calculate a first transmission parameter for the transmission section associated with the first user and a second transmission parameter for the transmission section associated with the second user subsequent to a termination of a successive allocation of all users for a group of transmission sections, wherein the first transmission parameter and the second transmission parameter are calculated such that an interference of the other users by the transmission to the previously allocated users is reduced or eliminated.

14. The apparatus in accordance with claim 1, in which the calculator is configured for calculating the receive parameter for the second selected data stream for the second user of the plurality of users associated with the second different individual transmission section additionally using the calculated receive parameter for the first user.

15. A method of calculating receive parameters for an MIMO system comprising a plurality of individual transmission sections, a transmission section comprising a transmit circuit being adjustable by a transmit parameter, and a plurality of individual users, a user comprising a receive circuit being adjustable by a receive parameter, comprising:
at a calculator comprising hardware,
calculating a receive parameter for a first selected data stream for a first user of the plurality of users using a channel information for a transmission channel between the user and a first individual transmission section, to which the user is associated; and
calculating a receive parameter for a second selected data stream for a second user of the plurality of users associated with a second different individual transmission section,
wherein a channel information between the first user and the second transmission section, to which the second user is associated with, or the calculated receive parameter for the first user is used in calculating the receive parameter for the second selected data stream for the second user, where an interference caused by a transmission of an individual transmission section at a user in a different transmission section is reduced or eliminated,
wherein the calculating a receive parameter for a first selected data stream and the calculating a receive parameter for a second selected data stream comprises:
calculating a projector matrix depending on a channel information between the first user and the second individual transmission section, or the receive parameter for the first user, and using the projector matrix together with the channel information between each user and its associated individual transmission section, for calculating the receive parameter for the second user, and wherein the projector matrix is calculated based on the following equation:

$$P_s^{(m+1)} = P_s^{(m)} - \frac{P_s^{(m)} H_{ks}^H u_m u_m^H H_{ks} P_s^{(m)}}{u_m^H H_{ks} P_s^{(m)} H_{ks}^H u_m} \ \forall \ s \in S.$$

wherein s indicates an individual transmission section from the plurality of individual transmission sections S, $P^{(m+1)}$ is an updated projector matrix for step m+1, $P^{(m)}$ is a projector matrix of an earlier updating step m, $H_{ks}$ is a channel matrix between a user k and an individual transmission section s, to which the user is not associated with, $u_m$ is a vector comprising a receive parameter or more receive parameters calculated for one or more preceding steps, and $^H$ indicates a conjugate complex transpose operation.

16. A non-transitory computer readable medium comprising a computer program for performing, when being executed on a processor, a method of calculating receive parameters for an MIMO system comprising a plurality of individual transmission sections, a transmission section comprising a transmit circuit being adjustable by a transmit parameter, and a plurality of individual users, a user comprising a receive circuit being adjustable by a receive parameter, the method comprising:

calculating a receive parameter for a first selected data stream for a first user of the plurality of users using a channel information for a transmission channel between the user and a first individual transmission section, to which the user is associated; and calculating a receive parameter for a second selected data stream for a second user of the plurality of users associated with a second individual transmission section, the second individual transmission section being different from the first individual transmission section, wherein a channel information between the first user and the second transmission section, to which the second user is not associated with, is used in calculating the receive parameter for the second selected data stream for the second user, where an interference caused by a transmission of an individual transmission section at a user associated with a different transmission section is reduced or eliminated wherein the calculating a receive parameter for a first selected data stream and the calculating a receive parameter for a second selected data stream comprises:

calculating a projector matrix depending on a channel information between the first user and the second individual transmission section, or the receive parameter for the first user, and using the projector matrix together with the channel information between each user and its associated individual transmission section, for calculating the receive parameter for the second user, and wherein the projector matrix is calculated based on the following equation:

$$P_s^{(m+1)} = P_s^{(m)} - \frac{P_s^{(m)} H_{ks}^H u_m u_m^H H_{ks} P_s^{(m)}}{u_m^H H_{ks} P_s^{(m)} H_{ks}^H u_m} \ \forall \ s \in S.$$

wherein s indicates an individual transmission section from the plurality of individual transmission sections S, $P^{(m+1)}$ is an updated projector matrix for step m+1, $P^{(m)}$ is a projector matrix of an earlier updating; step m, $H_{ks}$ is a channel matrix between a user k and an individual transmission section s, to which the user is not associated with, $u_m$ is a vector comprising a receive parameter or more receive parameters calculated for one or more preceding steps, and $^H$ indicates a conjugate complex transpose operation.

* * * * *